United States Patent
Galles et al.

(10) Patent No.: US 11,863,467 B2
(45) Date of Patent: Jan. 2, 2024

(54) METHODS AND SYSTEMS FOR LINE RATE PACKET CLASSIFIERS FOR PRESORTING NETWORK PACKETS ONTO INGRESS QUEUES

(71) Applicant: Pensando Systems Inc., Milpitas, CA (US)

(72) Inventors: Michael Brian Galles, Los Altos, CA (US); Vipin Jain, San Jose, CA (US)

(73) Assignee: PENSANDO SYSTEMS INC., Milpitas, CA (US)

( * ) Notice: Subject to any disclaimer, the term of this patent is extended or adjusted under 35 U.S.C. 154(b) by 0 days.

(21) Appl. No.: 17/580,367

(22) Filed: Jan. 20, 2022

(65) Prior Publication Data

US 2023/0231818 A1 Jul. 20, 2023

(51) Int. Cl.
| | |
|---|---|
| *H04L 49/00* | (2022.01) |
| *H04L 69/22* | (2022.01) |
| *H04L 47/32* | (2022.01) |
| *H04L 41/5019* | (2022.01) |
| *H04L 45/74* | (2022.01) |
| *H04L 47/6295* | (2022.01) |

(52) U.S. Cl.
CPC ...... *H04L 49/3018* (2013.01); *H04L 41/5019* (2013.01); *H04L 47/32* (2013.01); *H04L 69/22* (2013.01); *H04L 45/74* (2013.01); *H04L 47/6295* (2013.01)

(58) Field of Classification Search
CPC . H04L 49/3018; H04L 41/5019; H04L 47/32; H04L 47/6295; H04L 69/00; H04L 69/22; H04L 45/74; H04L 47/20
See application file for complete search history.

(56) References Cited

U.S. PATENT DOCUMENTS

| | | | | |
|---|---|---|---|---|
| 8,934,495 | B1 * | 1/2015 | Hilton | H04L 67/02 370/419 |
| 2003/0046396 | A1 * | 3/2003 | Richter | G06F 9/505 709/226 |

FOREIGN PATENT DOCUMENTS

WO WO-2013184121 A1 * 12/2013 ............. H04L 47/20

OTHER PUBLICATIONS

Graham, Robert David et al. "Finite State Machine Parsing for Internet Protocols: Faster Than You Think", 2014 IEEE Security and Privacy Workshops, (2014), pp. 185-190.
Attig, Michael et al. "400 GB/s Programmable Packet Parsing on a Single FPGA", (2011), 12 pgs.
Wikipedia, "IPsec", https://en.wikipedia.org/wiki/IPsec, downloaded Jul. 14, 2021, 8 pgs.

(Continued)

*Primary Examiner* — Mohamed A Kamara
(74) *Attorney, Agent, or Firm* — LOZA & LOZA LLP

(57) ABSTRACT

A network appliance can have an input port that can receive network packets at line rate, two or more ingress queues, a line rate classification circuit that can place the network packets on the ingress queues at the line rate, a packet buffer that can store the network packets, and a sub line rate packet processing circuit that can process the network packets that are stored in the packet buffer. The line rate classification circuit can place a network packet on one of the ingress queues based on the network packet's packet contents. A buffer scheduler can select network packets for processing by a sub line rate packet processing circuit based on the priority levels of the ingress queues.

20 Claims, 18 Drawing Sheets

(56) References Cited

OTHER PUBLICATIONS

Dommety, G. "Key and Sequence Number Extensions to GRE", Network Working Group, Request for Comments: 2890, Sep. 2000, 7 pgs.
Worster, T. et al. "Encapsulating MPLS in IP or Generic Routing Encapsulation (GRE)", Network Working Group, Request for Comments: 4023, Mar. 2005, 14 pgs.
Kent, S. et al. "Security Architecture for the Internet Protocol", Network Working Group, Request for Comments: 4301, Dec. 2005, 101 pgs.
Kent, S. "IP Authentication Header", Network Working Group, Request for Comments: 4302, Dec. 2005, 34 pgs.
Kent, S. "IP Encapsulating Security Payload (ESP)", Network Working Group, Request for Comments: 4303, Dec. 2005, 44 pgs.
Wouters, P. et al. "Cryptographic Algorithm Implementation Requirements and Usage Guidance for Encapsulating Security Payload (ESP) and Authentication Header (AH)", Internet Engineering Task Force (IETF), Request for Comments: 8221, Oct. 2017, 15 pgs.
Septinus, Konstantin et al. "A Fully Programmable FSM-based Processing Engine for Gigabytes/s Header Parsing", Conference Paper, Jul. 2010, 11 pgs.

\* cited by examiner

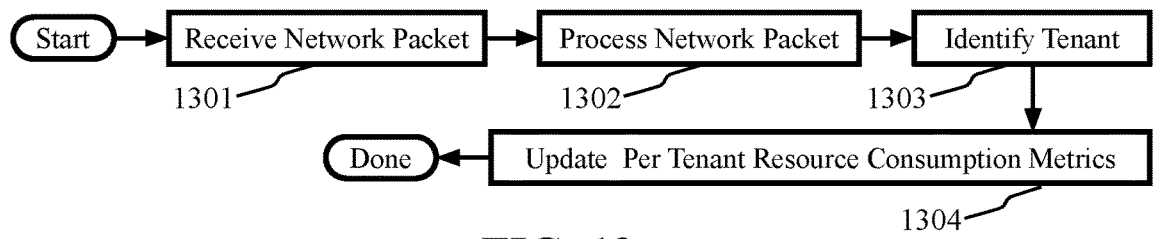
FIG. 13
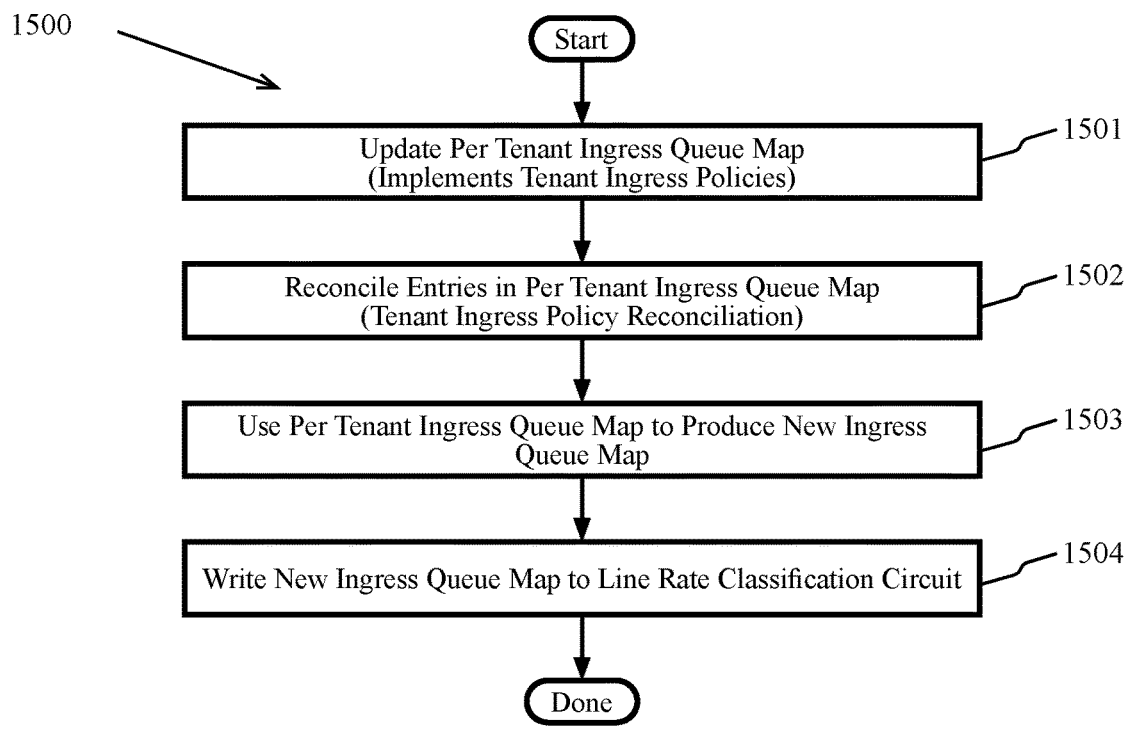
FIG. 14
FIG. 15

METHODS AND SYSTEMS FOR LINE RATE PACKET CLASSIFIERS FOR PRESORTING NETWORK PACKETS ONTO INGRESS QUEUES

TECHNICAL FIELD

The embodiments relate to computer networks, local area networks, and network appliances such as routers, switches, network interface cards (NICs), smart NICs, and distributed service cards (DSCs). The embodiments additionally relate to packet processing pipelines, ingress queues, and line rate packet classification. The embodiments also relate to using multiple input queues and a line rate packet classification circuit to sort packets onto multiple ingress queues before the packets are dropped or are processed by a packet processing pipeline circuit.

BACKGROUND

A host computer can have a network interface card (NIC) that provides network connectivity to processes running on the host computer. A standard NIC may act, in essence, as a pass-through device that simply passes network packets to and from a host computer that may perform full service packet processing. Hosts running in data centers often have workloads that include running numerous virtual machines (VMs) for numerous tenants of the data center. Data centers can use SmartNICs to help manage the data center and tenant workloads. SmartNICs can implement full service multi-tenant packet processing related to network storage, firewalling, routing, load balancing, packet inspection, and other functions. As such, many networking tasks can be off loaded from the hosts' CPUs and onto SmartNICs that are specialized for the tasks because custom circuitry in the SmartNICs can provide for extremely fast and efficient packet processing. A SmartNIC is not a simple pass-through device. Ideally, a SmartNIC can perform full service processing of all network packets at line rate. However, no device has infinite processing capabilities. As such, a SmartNIC may process packets at less than line rate in some cases such as when the full service processing of packets received over a time period takes longer than that time period.

Similar issues may arise with network appliances other than SmartNICs. For example, recent developments in data center technology include smart switches that, similar to SmartNICs, provide feature rich multi tenant processing. As such, there are cases in which a smart switch may process packets at less than line rate.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure as a prelude to the more detailed description that is presented later.

One aspect of the subject matter described in this disclosure can be implemented by a network appliance. The network appliance can include an input port configured to receive a plurality of network packets at a line rate, a plurality of ingress queues, a line rate classification circuit configured to place the network packets on the ingress queues at the line rate, a packet buffer configured to store the network packets, and a sub line rate packet processing circuit configured to process the network packets that are stored in the packet buffer, wherein the line rate classification circuit places a network packet that is one of the network packets on an ingress queue that is included in the ingress queues based on a tenant ID that is calculated using a packet header contents of the network packet.

Another aspect of the subject matter described in this disclosure can be implemented by a method. The method can include receiving a network packet at an input port operating at a line rate, processing the network packet with a line rate classifier circuit that selects an ingress queue that is included in a plurality of ingress queues, placing the network packet on the ingress queue, storing the network packet in a packet buffer as one of a plurality of buffered network packets, and using a sub line rate packet processing circuit to process the network packet after the network packet is stored in the packet buffer, wherein the sub line rate packet processing circuit is configured to process the buffered network packets that are selected from the ingress queues, the line rate classifier circuit and the sub line rate packet processing circuit operate concurrently, and the line rate classifier circuit is configured to process the network packets at the line rate.

Yet another aspect of the subject matter described in this disclosure can be implemented by a network appliance. The network appliance can include an input means for receiving a plurality of network packets at a line rate, a plurality of ingress queues, a classification means for placing the network packets on the ingress queues at the line rate and based on a packet contents of the network packets, a dedicated means for passing the network packets from the input means to the classification means, a buffering means for storing the network packets that have been placed on the ingress queues, and a sub line rate processing means for processing the network packets that have been placed on the ingress queues.

In some implementations of the methods and devices, the network appliance includes a dedicated communications circuit that passes the network packets from the input port to the line rate classification circuit, and an on-chip communications fabric that the sub line rate packet processing circuit uses to access the network packets that are stored in the packet buffer, wherein the dedicated communications circuit is distinct from the on-chip communications fabric. In some implementations of the methods and devices, the network appliance includes an ingress queue map configured to map a plurality of tenant IDs to the ingress queues, wherein the line rate classification circuit is configured to use the network packet to calculate a tenant ID that is included in the tenant IDs, and the network packet is placed on the one of the ingress queues associated with the tenant ID by the ingress queue map. In some implementations of the methods and devices, the ingress queues include a high priority queue and a low priority queue, and the sub line rate packet processing circuit preferably processes the network packets on the high priority queue over the network packets on the low priority queue. In some implementations of the methods and devices, the ingress queue map associates one of the tenant IDs with the high priority queue, and the network appliance is configured to adjust the ingress queue map to move one of the tenant IDs from association with the high priority queue to association with the low priority queue based on a resource consumption statistic associated with the one of the tenant IDs. In some implementations of the methods and devices, the network appliance is configured to adjust the ingress queue map to move one of the tenant IDs from association with one of the ingress queues to association with a different one of the ingress queues.

In some implementations of the methods and devices, the network appliance is configured to produce a resource consumption statistic for a tenant that is associated with the tenant ID, and the network appliance is configured to adjust the ingress queue map to move the tenant ID from association with a first one of the ingress queues to association with a second one of the ingress queues based on the resource consumption statistic. In some implementations of the methods and devices, the network appliance is installed in a server running a plurality of workloads for a plurality of tenants that includes the tenant, and the tenant IDs are associated with the tenants. In some implementations of the methods and devices, the network appliance is a top of rack network appliance providing network services to a plurality of servers running a plurality of workloads for a plurality of tenants that includes the tenant, and the tenant IDs are associated with the tenants. In some implementations of the methods and devices, each of the tenant IDs is represented by no more than 12 bits in the ingress queue map.

In some implementations of the methods and devices, the line rate classification circuit uses a hash function to produce the tenant ID. In some implementations of the methods and devices, the network appliance is configured to provide a first tenant with a first level of service, the network appliance is configured to provide a second tenant with a second level of service, an identical tenant ID is calculated for the first tenant and the second tenant, and network traffic for the first tenant and for the second tenant is queued to a same one of the ingress queues. In some implementations of the methods and devices, the network appliance is configured to drop packets from the ingress queues when at least one of the ingress queues is full and the network appliance is receiving network traffic faster than the sub line rate packet processing circuit can process the network traffic.

In some implementations of the methods and devices, the network packet is one of a plurality of network packets received by the input port, and the line rate classifier circuit processes every one of the network packets. In some implementations of the methods and devices, at least one of the network packets is dropped before the one of the network packets is processed by the sub line rate packet processing circuit. In some implementations of the methods and devices, the sub line rate packet processing circuit is configured to use an on-chip communications fabric to access the packet buffer, and the line rate classifier circuit receives the network packet from the input port via a dedicated communications circuit that is distinct from the on-chip communications fabric. In some implementations of the methods and devices, an ingress queue map is configured to associate a plurality of tenant IDs with the ingress queues, the line rate classification circuit is configured to use the network packet to calculate a tenant ID that is one of the tenant IDs, and the network packet is placed on the ingress queue that is associated with the tenant ID by the ingress queue map.

In some implementations of the methods and devices, the network appliance includes a tenant identification means for indicating a tenant, a line speed parsing means for using the packet contents to determine the tenant identification means, and a line speed selection means for using the tenant identification means to select one of the ingress queues.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

FIG. 13 illustrates a high-level flow diagram of a process that updates per tenant resource consumption statistics according to some aspects.

FIG. 14 illustrates a per tenant ingress queue map in accordance with some aspects.

FIG. 15 is a high-level flow diagram illustrating an exemplary process that uses a per tenant ingress queue map for maintaining an ingress queue map according to some aspects.

Throughout the description, similar reference numbers may be used to identify similar elements.

DETAILED DESCRIPTION

Figure 1:
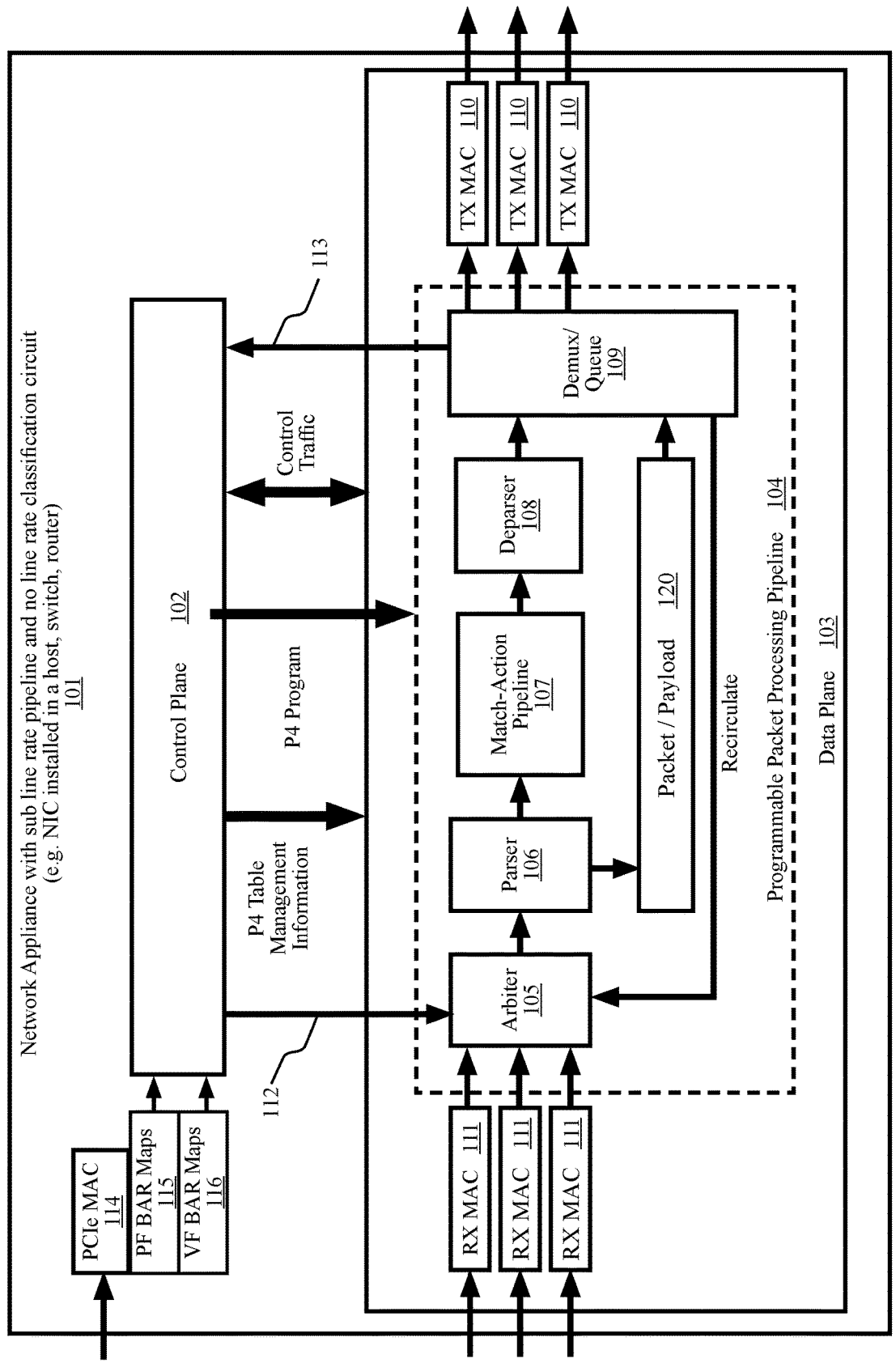
FIG. 1 is a functional block diagram of a network appliance with a control plane and a data plane but without a line rate classification circuit.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Network appliances can have one or more receive media access controllers (MACs) for receiving network traffic. Packets can arrive on the receive MACs at a higher rate than can be processed by the network appliance. A network appliance that has a single ingress queue will drop packets from that single ingress queue after that ingress queue fills. These drops have no tenant discrimination because the packets are dropped before tenant identification and resource consumption evaluation occurs. Thus, a greedy tenant with a high packet rate can impact well behaved tenants before an ingress processing pipeline (e.g., sub line rate packet processing circuit such as a full featured packet processing pipeline, full featured P4 engine, etc.) can exert control.

In a multi-tenant cloud deployment that uses SmartNIC based pipeline processing (e.g., processing using a full featured P4 engine) for ingressing traffic towards a host, tenant isolation can be critical and providing a method for identifying the tenant receiving a network packet can help ensure fairness or meeting a quality-of-service (QoS) guarantee. The tenant identifications can be used for queuing and scheduling network packets before the cloud services are processed, thereby providing a benefit to the cloud provider in ensuring the fairness, meeting QoS guarantees, etc. A data center and a tenant often agree to a service level agreement (SLA). The SLA may guarantee a minimum bandwidth to the tenant. There may be no need to limit any tenant's bandwidth when the network appliance is able to process every packet for every tenant. If every packet cannot be processed, then some packets must be dropped. Tenant discrimination can be used to preferentially drop packets of some tenants instead of others. An in-SLA tenant is a tenant that is consuming network resources (e.g., bandwidth) at or below the level guaranteed by that tenant's SLA. An out of SLA tenant is a tenant who is not an in-SLA tenant or a tenant who has no SLA or no guaranteed minimum service level. In order to meet the data center's commitments, the network appliance should preferentially drop out of SLA tenant's traffic in favor of in-SLA tenant's traffic.

Tenant discrimination can be provided by using multiple ingress queues and using a line rate classification circuit to select an ingress queue for each of the packets. The line rate classification circuit can be used to determine tenant IDs from each packet's header data. A tenant ID can be used to select an ingress queue. Packets for high priority tenants, well-behaved tenants, or in-SLA tenants can be queued on a first queue while packets for other tenants are queued on a second queue. More than two input queues may be implemented for finer grained control of which packets get dropped. A scheduler can use a scheduling policy such as weighted round robin (WRR) to select packets from the input queues for processing by the sub line rate packet processing circuit.

As discussed below, the sub line rate packet processing circuit can include a configurable parser and match-action units that can be used to implement networking rules (e.g., routing, firewalling, load balancing, network address translation, etc.). The line rate classification circuit can use a much simpler parser to obtain the contents of a few header fields of the packet. For example, a few layer 2 (L2), layer 3 (L3), and layer 4 (L4) fields can be sufficient for producing tenant IDs that are sufficient for line rate tenant discrimination. Line rate processing is processing that can be performed without dropping a packet. As such, the line rate classification circuit can classify every packet received by the network appliance. Some of those packets may be dropped after line rate classification.

One advantage of using a line rate classification circuit is that tenant discrimination is performed before a packet gets dropped. Another advantage is that in-SLA tenants may not be starved of bandwidth by out of SLA tenants. Yet another advantage is that the data center is better able to meet its service level guarantees to all its tenants.

In the field of data networking, the functionality of network appliances such as switches, routers, and NICs are often described in terms of functionality that is associated with a "control plane" and functionality that is associated with a "data plane." In general, the control plane refers to components and/or operations that are involved in managing forwarding information and the data plane refers to components and/or operations that are involved in forwarding packets from an input interface to an output interface according to the forwarding information provided by the control plane. The data plane may also refer to components and/or operations that implement packet processing operations related to encryption, decryption, compression, decompression, firewalling, and telemetry.

Aspects described herein process packets using match-action pipelines. A match-action pipeline is a part of the data plane that can process network traffic flows extremely quickly if the match-action pipeline is configured to process those traffic flows. Upon receiving a packet of a network traffic flow, the match-action pipeline can generate an index from data in the packet header. Finding a flow table entry for the network traffic flow at the index location in the flow table is the "match" portion of "match-action". If there is a "match", the "action" is performed to thereby process the packet. If there is no flow table entry for the network traffic flow, it is a new network traffic flow that the match-action pipeline is not yet configured to process. If there is no match, then the match-action pipeline can perform a default action.

The high-volume and rapid decision-making that occurs at the data plane is often implemented in fixed function application specific integrated circuits (ASICs). Although fixed function ASICs enable high-volume and rapid packet processing, fixed function ASICs typically do not provide enough flexibility to adapt to changing needs. Data plane processing can also be implemented in field programmable gate arrays (FPGAs) to provide a high level of flexibility in data plane processing.

FIG. 1 is a functional block diagram of a network appliance 101 with a control plane 102 and a data plane 103 but without a line rate classification circuit. A network appliance 101 can have a control plane 102 and a data plane 103. The control plane provides forwarding information (e.g., in the form of table management information) to the data plane and the data plane receives packets on input interfaces, processes the received packets, and then forwards packets to desired output interfaces. Additionally, control traffic (e.g., in the form of packets) may be communicated from the data plane to the control plane and/or from the control plane to the data plane. The data plane and control plane are sometimes referred to as the "fast" plane and the "slow" plane, respectively. In general, the control plane is responsible for less frequent and less time-sensitive operations such as updating Forwarding Information Bases (FIBs) and Label Forwarding Information Bases (LFIBs), while the data plane is responsible for a high volume of time-sensitive forwarding decisions that need to be made at a rapid pace. The control plane may implement operations related to packet routing that include InfiniBand channel adapter management functions, Open Shortest Path First (OSPF), Enhanced Interior Gateway Routing Protocol (EIGRP), Border Gateway Protocol (BGP), Intermediate System to Intermediate System (IS-IS), Label Distribution Protocol (LDP), routing tables and/or operations related to packet switching that include Address Resolution Protocol (ARP) and Spanning Tree Protocol (STP). The data plane (which may also be referred to as the "forwarding" plane) may implement operations related to parsing packet headers, Quality of Service (QoS), filtering, encapsulation, queuing, and policing. Although some functions of the control plane and data plane are described, other functions may be implemented in the control plane and/or the data plane.

Some techniques exist for providing flexibility at the data plane of network appliances that are used in data networks. For example, the concept of a domain-specific language for programming protocol-independent packet processors, known simply as "P4," has developed as a way to provide some flexibility at the data plane of a network appliance. The P4 domain-specific language for programming the data plane of network appliances is defined in the "P416 Language Specification," version 1.2.2, as published by the P4 Language Consortium on May 17, 2021, which is incorporated by reference herein. P4 (also referred to herein as the "P4 specification," the "P4 language," and the "P4 program") is designed to be implementable on a large variety of targets including switches, routers, programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The data plane 103 includes multiple receive media access controllers (MACs) (RX MAC) 111 and multiple transmit MACs (TX MAC) 110. The RX MACs 111 implement media access control on incoming packets via, for example, a MAC protocol such as Ethernet. The MAC protocol can be Ethernet and the RX MACs can be configured to implement operations related to, for example, receiving frames, half-duplex retransmission and back-off functions, Frame Check Sequence (FCS), interframe gap enforcement, discarding malformed frames, and removing the preamble, Start Frame Delimiter (SFD), and padding from a packet. Likewise, the TX MACs 110 implement media access control on outgoing packets via, for example, Ethernet. The TX MACs can be configured to implement operations related to, for example, transmitting frames, half-duplex retransmission and back-off functions, appending an FCS, interframe gap enforcement, and prepending a preamble, an SFD, and padding.

As illustrated in FIG. 1, a P4 program is provided to the data plane 103 via the control plane 102. Communications between the control plane and the data plane can use a dedicated channel or bus, can use shared memory, etc. The P4 program includes software code that configures the functionality of the data plane 103 to implement particular processing and/or forwarding logic and to implement processing and/or forwarding tables that are populated and managed via P4 table management information that is provided to the data plane from the control plane. Control traffic (e.g., in the form of packets) may be communicated from the data plane to the control plane and/or from the control plane to the data plane. In the context of P4, the control plane corresponds to a class of algorithms and the corresponding input and output data that are concerned with the provisioning and configuration of the data plane corresponds to a class of algorithms that describe transformations on packets by packet processing systems.

The data plane 103 includes a programmable packet processing pipeline 104 that is programmable using a domain-specific language such as P4 and that can be used to implement the programmable packet processing pipeline 104. As described in the P4 specification, a programmable packet processing pipeline can include an arbiter 105, a parser 106, a match-action pipeline 107, a deparser 108, and a demux/queue 109. The data plane elements described may be implemented as a P4 programmable switch architecture, as a P4 programmable NIC, as a P4 programmable router, or some other architecture. The arbiter 105 can act as an ingress unit receiving packets from RX-MACs 111 and can also receive packets from the control plane via a control plane packet input 112. The arbiter 105 can also receive packets that are recirculated to it by the demux/queue 109. The demux/queue 109 can act as an egress unit and can also be configured to send packets to a drop port (the packets thereby disappear), to the arbiter via recirculation, and to the control plane 102 via an output CPU port 113. The control plane is often referred to as a CPU (central processing unit) although, in practice, control planes often include multiple CPU cores and other elements. The arbiter 105 and the demux/queue 109 can be configured through the domain-specific language (e.g., P4).

The parser 106 is a programmable element that can be configured through the domain-specific language (e.g., P4) to extract information from a packet (e.g., information from the header of the packet). As described in the P4 specification, parsers describe the permitted sequences of headers within received packets, how to identify those header sequences, and the headers and fields to extract from packets. The information extracted from a packet by the parser can be referred to as a packet header vector or "PHV." The parser can identify certain fields of the header and can extract the data corresponding to the identified fields to generate the PHV. The PHV may include other data (often referred to as "metadata") that is related to the packet but not extracted directly from the header, including for example, the port or interface on which the packet arrived at the network appliance. Thus, the PHV may include other packet related data (metadata) such as input/output port number, input/output interface, or other data in addition to information extracted directly from the packet header. The PHV produced by the parser may have any size or length. For example, the PHV may be at least 4 bits, 8 bits, 16 bits, 32 bits, 64 bits, 128 bits, 256 bits, or 512 bits. In some cases, a PHV having even more bits (e.g., 6 Kb) may include all relevant header fields and metadata corresponding to a received packet. The size or length of a PHV corresponding to a packet may vary as the packet passes through the match-action pipeline.

The deparser 108 is a programmable element that is configured through the domain-specific language (e.g., P4) to generate packet headers from PHVs at the output of match-action pipeline 107 and to construct outgoing packets by reassembling the header(s) (e.g., Ethernet and IP headers, InfiniBand PDUs, etc.) as determined by the match-action pipeline. In some cases, a packet/payload may travel in a separate queue or buffer 120, such as a first-in-first-out (FIFO) queue, until the packet payload is reassembled with its corresponding PHV at the deparser to form a packet. The deparser may rewrite the original packet according to the PHV fields that have been modified (e.g., added, removed, or updated). In some cases, a packet processed by the parser may be placed in a packet buffer/traffic manager for scheduling and possible replication. In some cases, once a packet is scheduled and leaves the packet buffer/traffic manager, the packet may be parsed again to generate an egress PHV. The egress PHV may be passed through a match-action pipeline after which a final deparser operation may be executed (e.g., at deparser 108) before the demux/queue 109 sends the packet to the TX MAC 110 or recirculates it back to the arbiter 105 for additional processing.

A network appliance 101 can have a peripheral component interconnect extended (PCIe) interface such as PCIe media access control (MAC) 114. A PCIe MAC can have a base address register (BAR) at a base address in a host system's memory space. Processes, typically device drivers within the host system's operating system, can communicate with a NIC via a set of registers beginning with the BAR. Some PCIe devices are single root input output virtualization (SR-IOV) capable. Such PCIe devices can have a physical function (PF) and multiple virtual functions (VFs). A PF BAR map 115 can be used by the host machine to communicate with the PCIe card. A VF BAR map 116 can be used by a virtual machine (VM) running on the host to communicate with the PCIe card. Typically, the VM can access the NIC using a device driver within the VM and at a memory address within the VMs memory space. Many SR-IOV capable PCIe cards can map that location in the VM's memory space to a VF BAR. As such a VM may be configured as if it has its own NIC while in reality it is associated with a VF provided by a SR-IOV capable NIC. As discussed below, some PCIe devices can have multiple PFs. For example, a NIC can provide network connectivity via one PF and can provide an InfiniBand channel adapter via another PF. As such, the NIC can provide "NIC' VFs and "InfiniBand" VFs to VMs running on the host. The Infini-Band PF and VFs can be used for data transfers, such as remote direct memory access (RDMA) transfers to other VMs running on the same or other host computers. Similarly, a NIC can provide non-volatile memory express (NVMe) and small computer system interface (SCSI) PFs and VFs to VMs running on the host.

Figure 2:
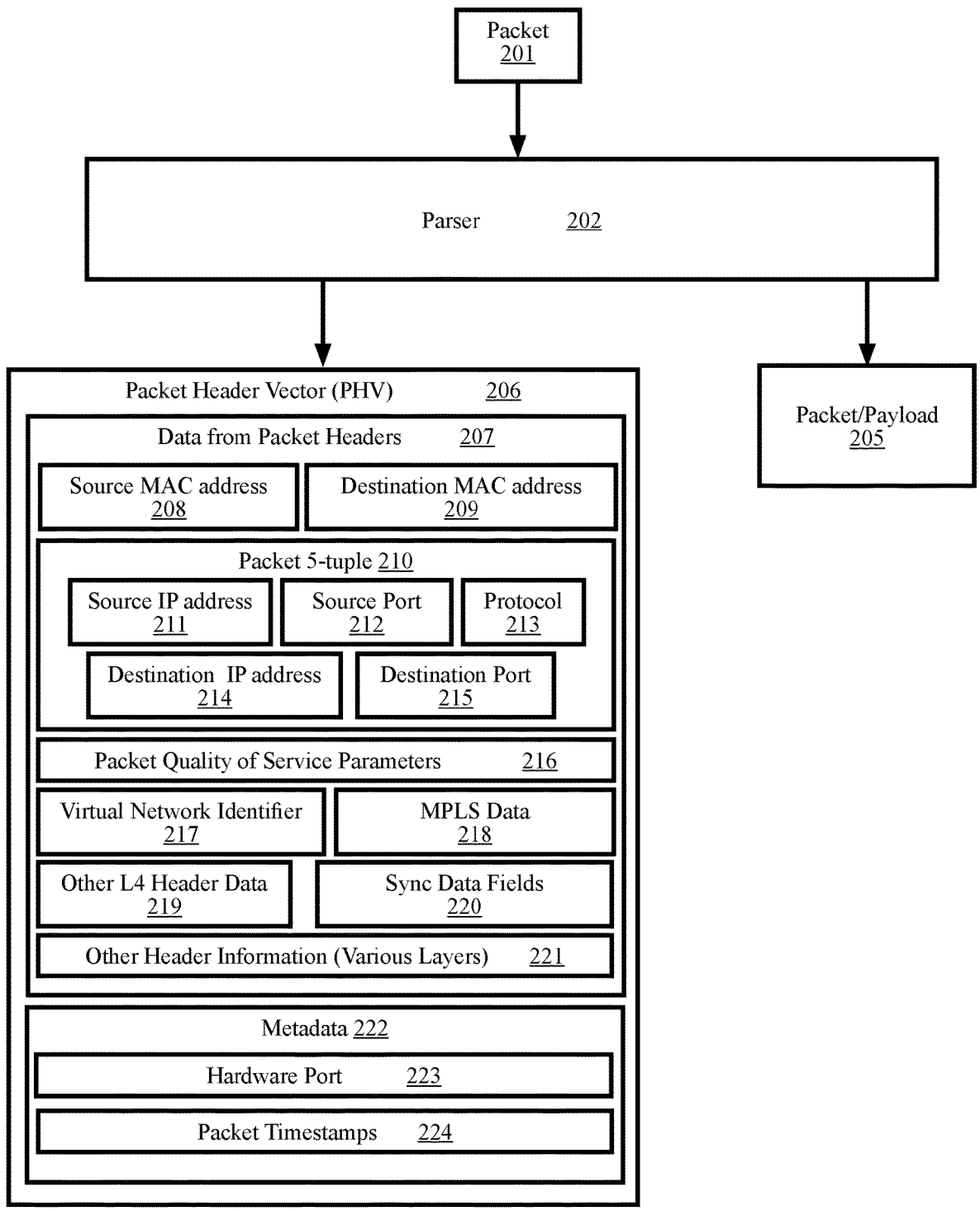
FIG. 2 is a high-level diagram illustrating an example of generating a packet header vector from a packet according to some aspects.

FIG. 2 is a high-level diagram illustrating an example of generating a packet header vector 206 from a packet 201 according to some aspects. The parser 202 can receive a packet 201 that has layer 2, layer 3, layer 4, and layer 7 headers and payloads. The parser can generate a packet header vector (PHV) from packet 201. The packet header vector 206 can include many data fields including data from packet headers 207 and metadata 222. The metadata 222 can include data generated by the network appliance such as the hardware port 223 on which the packet 201 was received and the packet timestamps 224 indicating when the packet 201 was received by the network appliance, enqueued, dequeued, etc.

The source MAC address 208 and the destination MAC address 209 can be obtained from the packet's layer 2 header. The source IP address 211 can be obtained from the packet's layer 3 header. The source port 212 can be obtained from the packet's layer 4 header. The protocol 213 can be obtained from the packet's layer 3 header. The destination IP address 214 can be obtained from the packet's layer 3 header. The destination port 215 can be obtained from the packet's layer 4 header. The packet quality of service parameters 216 can be obtained from the packet's layer 3 header or another header based on implementation specific details. The virtual network identifier 217 may be obtained from the packet's layer 2 header. The multi-protocol label switching (MPLS) data 218, such as an MPLS label, may be obtained from the packet's layer 2 header. The other layer 4 data 219 can be obtained from the packet's layer 4 header. State synchronization data, such as sync data fields 220, can be obtained from record transition data that may be in the layer 7 packet in the layer 4 payload. The other header information 221 is the other information contained in the packet's layer 2, layer 3, layer 4, and layer 7 headers.

The packet 5-tuple 210 is often used for generating keys for match tables, discussed below. The packet 5-tuple 210 can include the source IP address 211, the source port 212, the protocol 213, the destination IP address 214, and the destination port 215.

Those practiced in computer networking protocols realize that the headers carry much more information than that described here, realize that substantially all of the headers are standardized by documents detailing header contents and fields, and know how to obtain those documents. The parser can also be configured to output a packet or payload 205. Recalling that the parser 202 is a programmable element that is configured through the domain-specific language (e.g., P4) to extract information from a packet, the specific contents of the packet or payload 205 are those contents specified via the domain specific language. For example, the contents of the packet or payload 205 can be the layer 3 payload.

Figure 3:
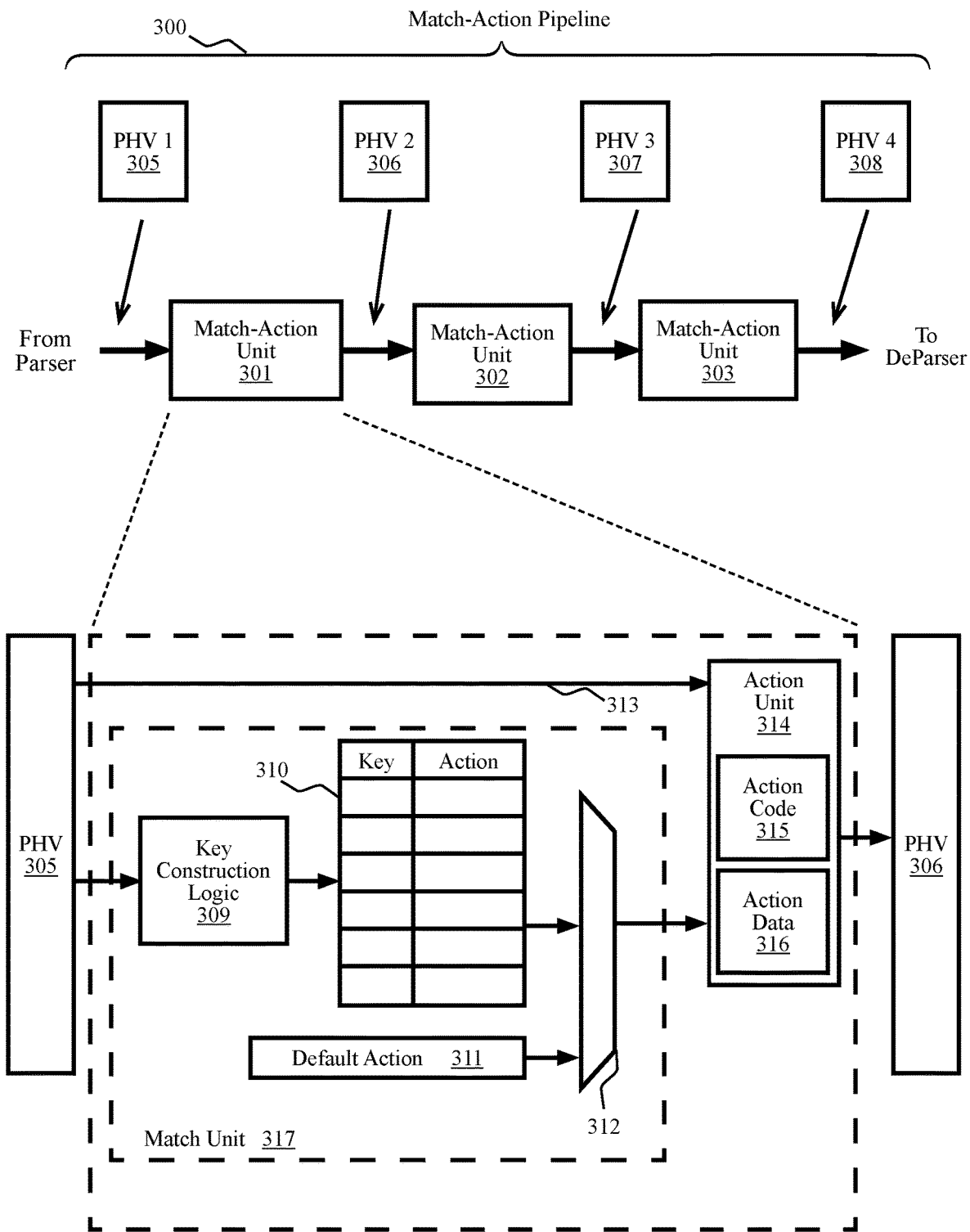
FIG. 3 is a functional block diagram illustrating an example of a match-action unit in a match-action pipeline according to some aspects.

FIG. 3 is a functional block diagram illustrating an example of a match-action unit 301 in a match-action pipeline 300 according to some aspects. FIG. 3 introduces certain concepts related to match-action units and match-action pipelines and is not intended to be limiting. The match-action units 301, 302, 303 of the match-action pipeline 300 are programmed to perform "match-action" operations in which a match unit performs a lookup using at least a portion of the PHV and an action unit performs an action based on an output from the match unit. A PHV generated at the parser may be passed through each of the match-action units in the match-action pipeline in series and each match-action unit implements a match-action operation. The PHV and/or table entries may be updated in each stage of match-action processing according to the actions specified by the P4 programming. In some instances, a packet may be recirculated through the match-action pipeline, or a portion thereof, for additional processing. Match-action unit 1 301 receives PHV 1 305 as an input and outputs PHV 2 306. Match-action unit 2 302 receives PHV 2 306 as an input and outputs PHV 3 307. Match-action unit 3 303 receives PHV 3 307 as an input and outputs PHV 4 308.

An expanded view of elements of a match-action unit 301 of match-action pipeline 300 is shown. The match-action unit includes a match unit 317 (also referred to as a "table engine") that operates on an input PHV 305 and an action unit 314 that produces an output PHV 306, which may be a modified version of the input PHV 305. The match unit 317 can include key construction logic 309, a lookup table 310, and selector logic 312. The key construction logic 309 is configured to generate a key from at least one field in the PHV (e.g., 5-tuple, InfiniBand queue pair identifiers, etc.). The lookup table 310 is populated with key-action pairs, where a key-action pair can include a key (e.g., a lookup key) and corresponding action code 315 and/or action data 316. A P4 lookup table may be viewed as a generalization of traditional switch tables, and can be programmed to implement, for example, routing tables, flow lookup tables, ACLs, and other user-defined table types, including complex multi-variable tables. The key generation and lookup functions constitute the "match" portion of the operation and produce an action that is provided to the action unit via the selector logic. The action unit executes an action over the input data (which may include data 313 from the PHV) and provides an output that forms at least a portion of the output PHV. For example, the action unit executes action code 315 on action data 316 and data 313 to produce an output that is included in the output PHV 306. If no match is found in the lookup table, then a default action 311 may be implemented. A flow miss is an example of a default action that may be executed when no match is found. The operations of the match-action unit can be programmable by the control plane via P4 and the contents of the lookup table can be managed by the control plane.

Figure 4:
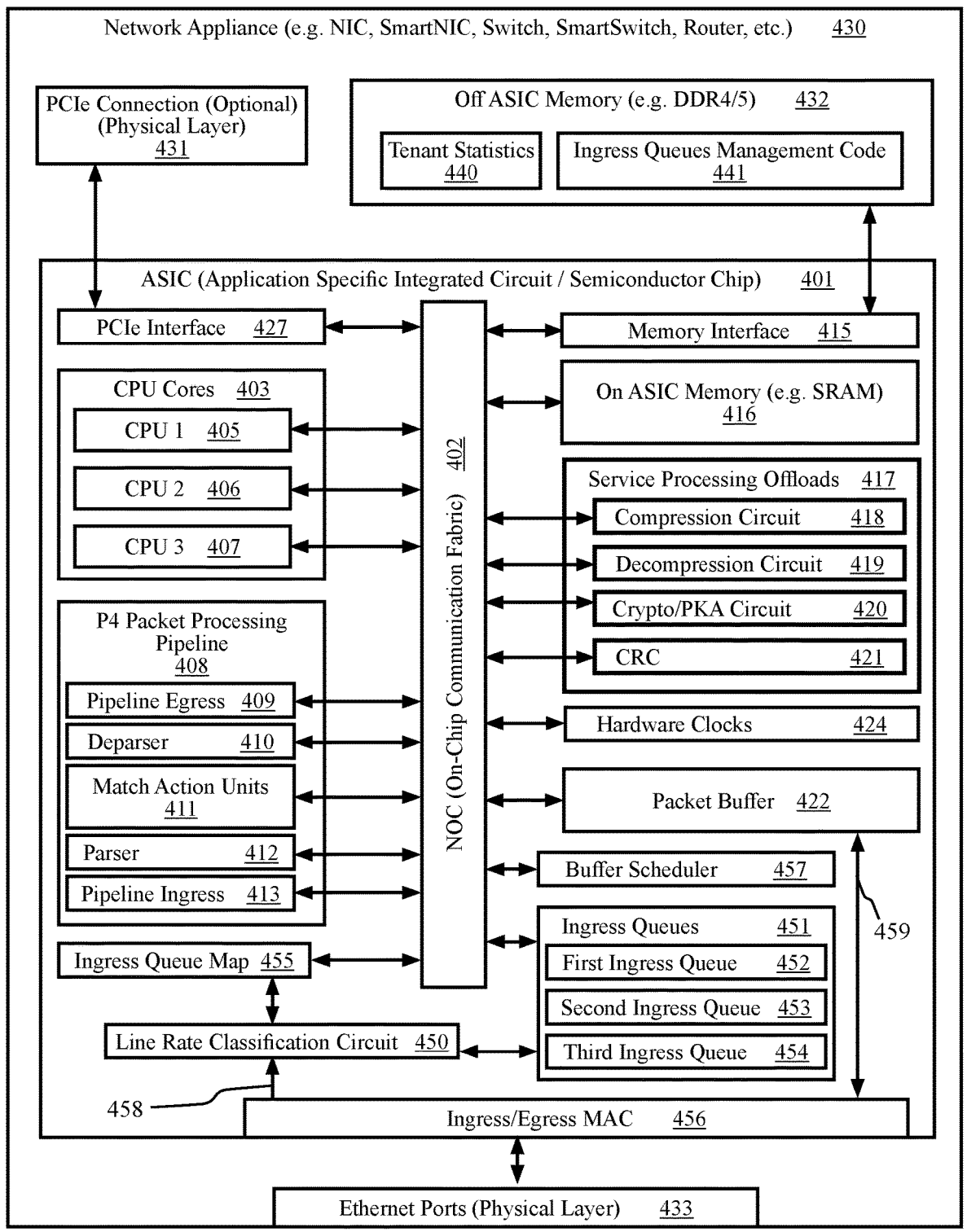
FIG. 4 is a functional block diagram of a network appliance having an application specific integrated circuit (ASIC), according to some aspects.

FIG. 4 is a functional block diagram of a network appliance 430 having an application specific integrated circuit (ASIC) 401, according to some aspects. A network appliance may be a network interface card (NIC), SmartNIC, switch, SmartSwitch, router, or other device that handles network traffic. If the network appliance is a network interface card (NIC) then the NIC can be installed in a host computer and can act as a network appliance for the host computer and for virtual machines running on the host computer. Such a NIC can have a PCIe connection 431 for communicating with the host computer. The network appliance 430 can have an ASIC 401, off-ASIC memory 432, and ethernet ports 433. The off-ASIC memory 432 can be one of the widely available memory modules or chips such as double data rate 4 (DDR4) synchronous dynamic random-access memory (SDRAM) such that the ASIC has access to many gigabytes of memory on the network appliance 430. The ethernet ports 433 provide physical connectivity to a computer network such as the internet.

The ASIC 401 is a semiconductor chip having many core circuits interconnected by an on-chip communications fabric, sometimes called a network on a chip (NOC) 402. NOCs are often implementations of standardized communications fabrics such as the widely used AXI bus. The ASIC's core circuits can include a PCIe interface 427, CPU cores 403, P4 packet processing pipeline 408 elements, memory interface 415, on ASIC memory (e.g., SRAM) 416, service processing offloads 417, a packet buffer 422, extended packet processing pipeline 423, and packet ingress/egress circuits 414. The PCIe interface 427 can be used to communicate with a host computer via the PCIe connection 431. The CPU cores 403 can include numerous CPU cores such as CPU 1 405, CPU 2 406, and CPU 3 407. The P4 packet processing pipeline 408 can include a pipeline ingress circuit 413, a parser circuit 412, match-action units 411, a deparser circuit 410, and a pipeline egress circuit 409. The service processing offloads 417 are circuits implementing functions that the ASIC uses so often that the designer has chosen to provide hardware for offloading those functions from the CPUs. The service processing offloads can include a compression circuit 418, decompression circuit 419, a crypto/PKA circuit 420, and a CRC calculation circuit 421. The specific core circuits implemented within the non-limiting example of ASIC 401 have been selected such that the ASIC implements many, perhaps all, of the functionality of an InfiniBand channel adapter, of an NVMe card, and of a network appliance that processes network traffic flows carried by IP (internet protocol) packets.

A network device can include precision clocks that output a precise time, clocks that are synchronized to remote authoritative clocks via PTP, and hardware clocks 424. A hardware clock may provide a time value (e.g., year/day/hour/minute/second/ . . . ) or may simply be a counter that is incremented by one at regular intervals (e.g., once per clock cycle for a device having a 10 nsec. clock period). Time values obtained from the clocks can be used as timestamps for events such as enqueuing/dequeuing a packet.

The P4 packet processing pipeline 408 is a specialized set of elements for processing network packets such as IP (internet protocol) packets and InfiniBand PDUs (protocol data units). The P4 pipeline can be configured using a domain-specific language such as the P4 domain specific language. As described in the P4 specification, the primary abstractions provided by the P4 language relate to header types, parsers, tables, actions, match-action units, control flow, extern objects, user-defined metadata, and intrinsic metadata.

The network appliance 430 can include a memory 432 for running Linux or some other operating system and for storing data used by the processes implementing network services. A network appliance that uses a line rate classification circuit for tenant discrimination can store tenant statistics 440 and ingress queues management code 441. The tenant statistics 440 can indicate values for statistics that are kept for tenants. The statistics kept for a tenant can include network bandwidth used by the tenant, the number of the tenant's packets processed during a time period, the number of the tenant's packets dropped from the ingress queues, and other statistics. The ingress queue management code 441 can be code that is executable by the CPU cores 403 for maintaining or rewriting the ingress queue map 455 based on the tenant statistics 440. The ingress queue management code 441 can be code that is executable by the CPU cores 403 for managing the ingress queues 451. For example, the ingress queues 451 may be resized when packets are being dropped from one queue while the other has a number of vacant slots that exceeds a threshold.

The CPU cores 403 can be general purpose processor cores, such as ARM processor cores, MIPS processor cores, and/or x86 processor cores, as is known in the field. Each CPU core can include a memory interface, an ALU, a register bank, an instruction fetch unit, and an instruction decoder, which are configured to execute instructions independently of the other CPU cores. The CPU cores may be Reduced Instruction Set Computers (RISC) CPU cores that are programmable using a general-purpose programming language such as C.

The CPU cores 403 can also include a bus interface, internal memory, and a memory management unit (MMU) and/or memory protection unit. For example, the CPU cores may include internal cache, e.g., L1 cache and/or L2 cache, and/or may have access to nearby L2 and/or L3 cache. Each CPU core may include core-specific L1 cache, including instruction-cache and data-cache and L2 cache that is specific to each CPU core or shared amongst a small number of CPU cores. L3 cache may also be available to the CPU cores.

There may be multiple CPU cores 403 available for control plane functions and for implementing aspects of a slow data path that includes software implemented packet processing functions. The CPU cores may be used to implement discrete packet processing operations such as L7 applications (e.g., HTTP load balancing, L7 firewalling, and/or L7 telemetry), certain InfiniBand channel adapter functions, flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The packet buffer 422 can act as a central on-chip packet switch that delivers packets from the ingress/egress MAC 456 to packet processing elements of the data plane and vice-versa. The packet processing elements can include a slow data path implemented in software and a fast data path implemented by packet processing circuitry 408.

The packet processing pipeline circuit 408 can be a specialized circuit or part of a specialized circuit using one or more ASICs or FPGAs to implement programmable packet processing pipelines such as the programmable packet processing pipeline 104 of FIG. 1. Some embodiments include ASICs or FPGAs implementing a P4 pipeline as a fast data path within the network appliance. The fast data path is called the fast data path because it processes packets faster than a slow data path that can also be implemented within the network appliance. An example of a slow data path is a software implemented data path wherein the CPU cores 403 and memory 432 are configured via software to implement a slow data path. A network appliance having two data paths has a fast data path and a slow data path when one of the data paths processes packets faster than the other data path.

All memory transactions in the network appliance 430, including host memory transactions, on board memory transactions, and register reads/writes may be performed via a coherent interconnect 402. In one non-limiting example, the coherent interconnect can be provided by a network on a chip (NOC) "IP core". Semiconductor chip designers may license and use prequalified IP cores within their designs. Prequalified IP cores may be available from third parties for inclusion in chips produced using certain semiconductor fabrication processes. A number of vendors provide NOC IP cores. The NOC may provide cache coherent interconnect between the NOC masters, including the packet processing pipeline circuits 408, CPU cores 403, memory interface 415, and PCIe interface 427. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches.

The ingress/egress MAC can use the ethernet ports 433 to send packets to a computer network and to receive packets from the computer network. When a packet is received, the ingress/egress MAC 456 can act as an input port and can store the entire packet directly into the packet buffer 422 as a buffered network packet while also passing the packet to the line rate classification circuit 450. The network packet may be passed to the line rate classification circuit 450 by passing the entire packet or a predetermined portion of the packet. For example, the input port (ingress/egress MAC 456) may be configured to pass the first kilobyte or half kilobyte of the packet to the line rate classification circuit. A dedicated communications circuit 458 can be used to pass the packet from the input port 456 to the line rate classification circuit 450. As discussed above, a NOC 402 may be used as a communications fabric within the ASIC 401. The NOC 402, however, provides communications services to many components and may not be immediately available when a packet is received. A communications circuit other than the NOC, the dedicated communications circuit 458, may therefore be used. The dedicated communications circuit 458 may be an on chip bus or a coherent interconnect that directly connects the input port 456 to the line rate classification circuit 450.

The line rate classification circuit 450 can use the packet contents of the packet to produce a data value (e.g., the tenant ID). For example, field values of L2, L3, and L4 header fields can be used to produce the data value. An ingress queue map 455 can map the data value to a queue identifier that identifies one of the ingress queues 451. As such, one of the ingress queues is selected based on the packet contents of the packet. The ingress queues 451 can include a first ingress queue 452, a second ingress queue 453, and a third ingress queue 454. Implementations having only two ingress queues may use a one bit queue identifier to indicate the selected ingress queue. The buffer scheduler 457 can select a packet from the ingress queues 451 for processing by the packet processing pipeline circuit 408 or other components of the ASIC.

Figure 5:
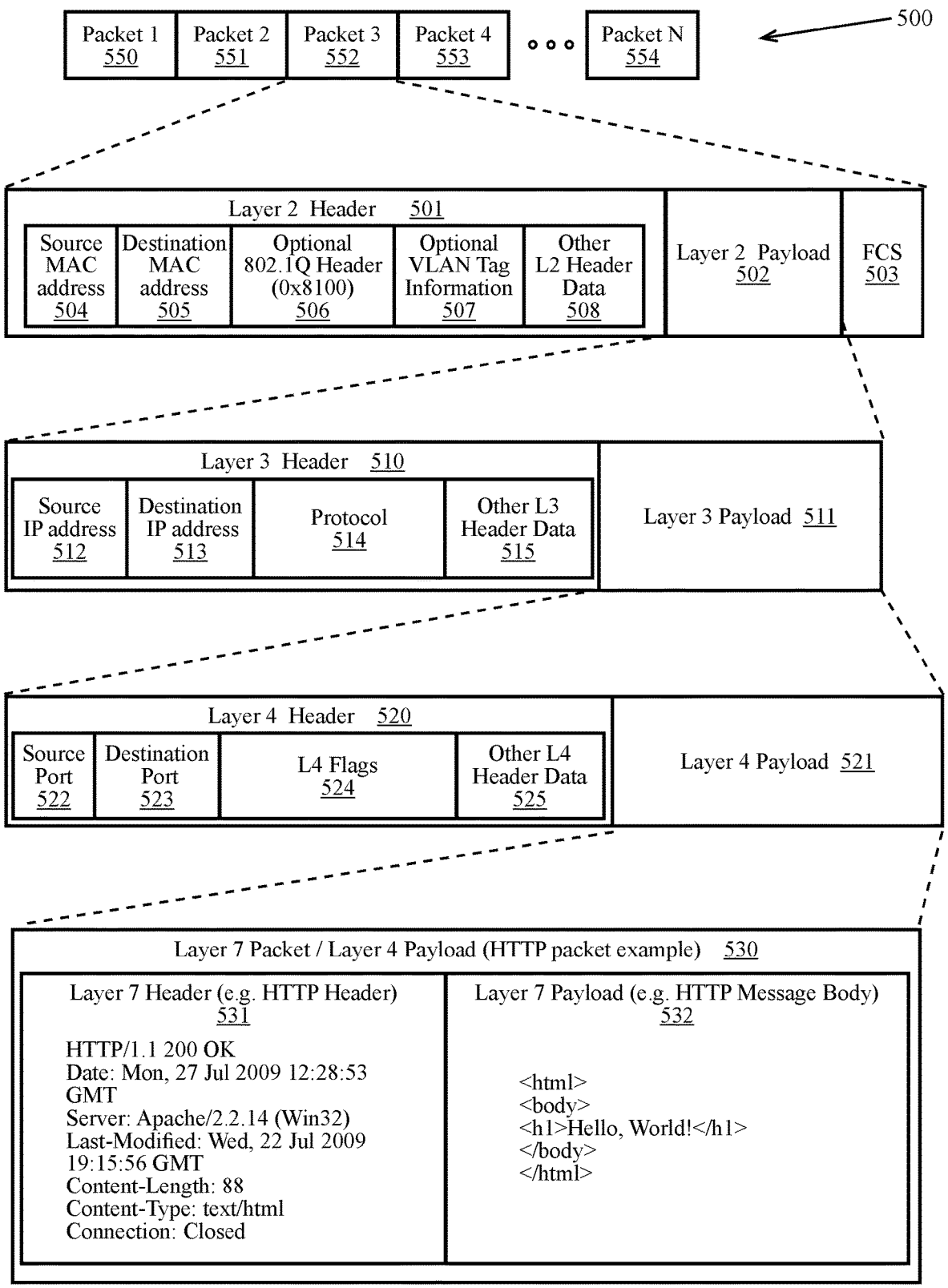
FIG. 5 illustrates packet headers and payloads of packets for network traffic flows including layer 7 fields according to some aspects.

FIG. 5 illustrates packet headers and payloads of packets for network flows 500 including layer 7 fields according to some aspects. A network flow 500 can have numerous network packets such as a first packet 550, a second packet 551, a third packet 552, a fourth packet 553, and a final packet 554 with many more packets between the fourth packet 553 and the final packet 554. The term "the packet" or "a packet" may refer to any of the packets in a network flow.

Packets can be constructed and interpreted in accordance with the internet protocol suite. The Internet protocol suite is the conceptual model and set of communications protocols used in the Internet and similar computer networks. A packet can be transmitted and received as a raw bit stream over a physical medium at the physical layer, sometimes called layer 1. The packets can be received by a RX MAC 111 as a raw bit stream or transmitted by TX MAC 110 as a raw bit stream.

The link layer is often called layer 2. The protocols of the link layer operate within the scope of the local network connection to which a host is attached and includes all hosts accessible without traversing a router. The link layer is used to move packets between the interfaces of two different hosts on the same link. The packet has a layer 2 header 501, a layer 2 payload 502, and a layer 2 frame check sequence (FCS) 503. The layer 2 header can contain a source MAC address 504, a destination MAC address 505, an optional 802.1Q header 506, optional VLAN tag information 507, and other layer 2 header data 508. The input ports 111 and output ports 110 of a network appliance 101 can have MAC addresses. A network appliance 101 can have a MAC address that is applied to all or some of the ports. Alternatively, a network appliance may have one or more ports that each have their own MAC address. In general, each port can send and receive packets. As such, a port of a network appliance can be configured with a RX MAC 111 (input port) and a TX MAC 110 (output port). Ethernet, also known as Institute of Electrical and Electronics Engineers (IEEE) 802.3, is a layer 2 protocol. IEEE 802.11 (WiFi) is another widely used layer 2 protocol. The layer 2 payload 502 can include a layer 3 packet. The layer 2 FCS 503 can include a CRC (cyclic redundancy check) calculated from the layer 2 header and layer 2 payload. The layer 2 FCS can be used to verify that the packet has been received without errors. IEEE 802.1Q is the networking standard that supports VLANs on IEEE 802.3 networks. The optional 802.1Q header 506 and VLAN tag information 507 are specified by the IEEE 802.1Q standard. The 802.1Q header is the two-octet value 0x8100 that indicates that VLAN tag information 507 is present. The VLAN tag information includes a 12-bit VLAN identifier. As such, a LAN can be configured to have 4094 VLANs (0x000 and 0xFFF are reserved values).

The internet layer, often called layer 3, is the network layer where layer 3 packets can be routed from a first node to a second node across multiple intermediate nodes. The nodes can be network appliances such as network appliance 101. Internet protocol (IP) is a commonly used layer 3 protocol. The layer 3 packet can have a layer 3 header 510 and a layer 3 payload 511. The layer 3 header 510 can have a source IP address 512, a destination IP address 513, a protocol indicator 514, and other layer 3 header data 515. As an example, a first node can send an IP packet to a second node via an intermediate node. The IP packet therefore has a source IP address indicating the first node and a destination IP address indicating the second node. The first node makes a routing decision that the IP packet should be sent to the intermediate node. The first node therefore sends the IP packet to the intermediate node in a first layer 2 packet. The first layer 2 packet has a source MAC address 504 indicating the first node, a destination MAC address 505 indicating the intermediate node, and has the IP packet as a payload. The intermediate node receives the first layer 2 packet. Based on the destination IP address, the intermediate node determines that the IP packet is to be sent to the second node. The intermediate node sends the IP packet to the second node in a second layer 2 packet having a source MAC address 504 indicating the intermediate node, a destination MAC address 505 indicating the second node, and the IP packet as a payload. The layer 3 payload 511 can include headers and payloads for higher layers in accordance with higher layer protocols such as transport layer protocols.

The transport layer, often called layer 4, can establish basic data channels that applications use for task-specific data exchange and can establish host-to-host connectivity. A layer 4 protocol can be indicated in the layer 3 header 510 using protocol indicator 514. Transmission control protocol (TCP), user datagram protocol (UDP), and internet control message protocol (ICMP) are common layer 4 protocols. TCP is often referred to as TCP/IP. TCP is connection oriented and can provide reliable, ordered, and error-checked delivery of a stream of bytes between applications running on hosts communicating via an IP network. When carrying TCP data, a layer 3 payload 511 includes a TCP header and a TCP payload. UDP can provide for computer applications to send messages, in this case referred to as datagrams, to other hosts on an IP network using a connectionless model. When carrying UDP data, a layer 3 payload 511 includes a UDP header and a UDP payload. ICMP is used by network devices, including routers, to send error messages and operational information indicating success or failure when communicating with another IP address. ICMP uses a connectionless model.

A layer 4 packet can have a layer 4 header 520 and a layer 4 payload 521. The layer 4 header 520 can include a source port 522, destination port 523, layer 4 flags 524, and other layer 4 header data 525. The source port and the destination port can be integer values used by host computers to deliver packets to application programs configured to listen to and send on those ports. The layer 4 flags 524 can indicate a status of or action for a network traffic flow. A layer 4 payload 521 can contain a layer 7 packet.

The application layer, often called layer 7, includes the protocols used by most applications for providing user services or exchanging application data over the network connections established by the lower-level protocols. Examples of application layer protocols include Precision Time Protocol (PTP), Hypertext Transfer Protocol (HTTP), File Transfer Protocol (FTP), Simple Mail Transfer Protocol (SMTP), and Dynamic Host Configuration (DHCP). Data coded according to application layer protocols can be encapsulated into transport layer protocol units (such as TCP or UDP messages), which in turn use lower layer protocols to effect actual data transfer.

A layer 4 payload 521 may include a layer 7 packet 530. A layer 7 packet can have a layer 7 header 531 and a layer 7 payload 532. The illustrated layer 7 packet is an HTTP packet. The layer 7 header 531 is an HTTP header, and the layer 7 payload 532 is an HTTP message body. The HTTP message body is illustrated as a hypertext markup language (HTML) document. HTTP is specified in requests for comment (RFCs) published by the Internet Engineering Task Force (IETF). IETF RFC 7231 specifies HTTP version 1.1. IETF RFC 7540 specifies HTTP version 2. HTTP version 3 is not yet standardized, but a draft standard has been published by the IETF as "draft-ietf-quic-http-29". HTML is a "living" standard that is currently maintained by Web Hypertext Application Technology Working Group (WHATWG). The HTTP header can be parsed by a P4 pipeline because it has a well-known format having well known header fields. Similarly, HTML documents can be parsed, at least in part, by a P4 pipeline to the extent that the HTML document has specific fields, particularly if those specific fields reliably occur at specific locations within the HTML document. Such is often the case when servers consistently respond by providing HTML documents.

Figure 6:
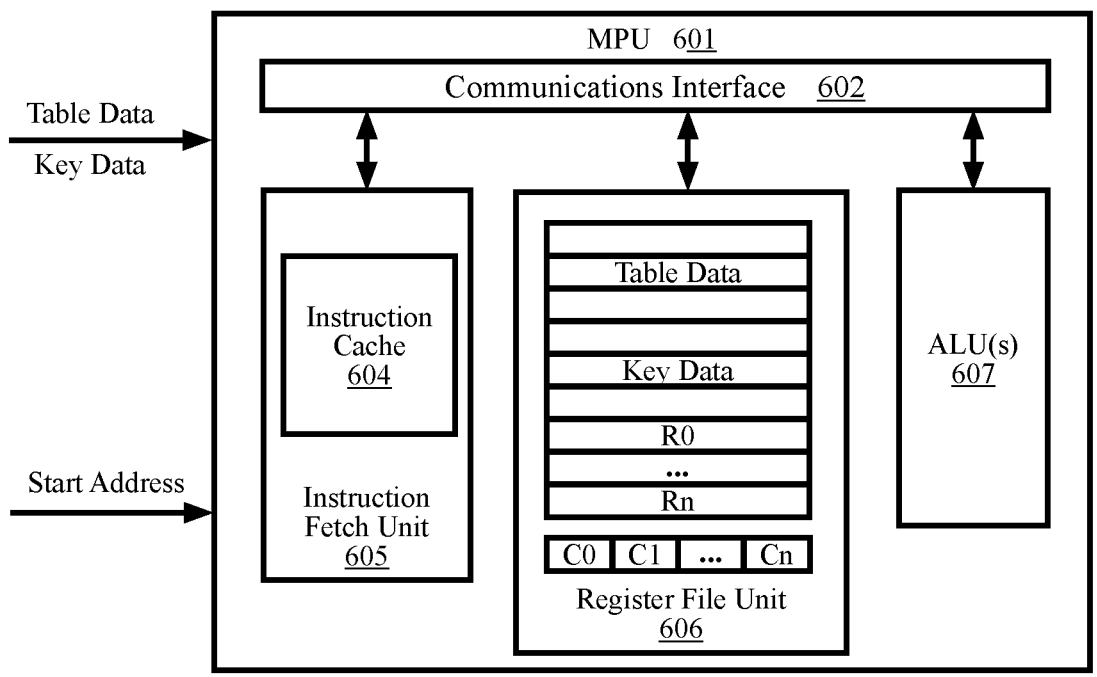
FIG. 6 illustrates a block diagram of a match processing unit (MPU) that may be used within the exemplary system of FIG. 4 to implement some aspects.

FIG. 6 illustrates a block diagram of a match processing unit (MPU) 601, also referred to as an action unit, that may be used within the exemplary system of FIG. 4 to implement some aspects. The MPU 601 can have multiple functional units, memories, and a register file. For example, the MPU 601 may have an instruction fetch unit 605, a register file unit 606, a communication interface 602, arithmetic logic units (ALUs) 607 and various other functional units.

In the illustrated example, the MPU 601 can have a write port or communication interface 602 allowing for memory read/write operations. For instance, the communication interface 602 may support packets written to or read from an external memory or an internal static random-access memory (SRAM). The communication interface 602 may employ any suitable protocol such as advanced extensible interface (AXI) protocol. AXI is a high-speed/high-end on-chip bus protocol and has channels associated with read, write, address, and write response, which are respectively separated, individually operated, and have transaction properties such as multiple-outstanding address or write data interleaving. The AXI interface 602 may include features that support unaligned data transfers using byte strobes, burst based transactions with only start address issued, separate address/control and data phases, issuing of multiple outstanding addresses with out of order responses, and easy addition of register stages to provide timing closure. For example, when the MPU executes a table write instruction, the MPU may track which bytes have been written to (a.k.a. dirty bytes) and which remain unchanged. When the table entry is flushed back to the memory, the dirty byte vector may be provided to AXI as a write strobe, allowing multiple writes to safely update a single table data structure as long as they do not write to the same byte. In some cases, dirty bytes in the table need not be contiguous and the MPU may only write back a table if at least one bit in the dirty vector is set. Though packet data is transferred according the AXI protocol in the packet data communication on-chip interconnect system according to the present exemplary embodiment in the present specification, it can also be applied to a packet data communication on-chip interconnect system operating by other protocols supporting a lock operation, such as advanced high-performance bus (AHB) protocol or advanced peripheral bus (APB) protocol in addition to the AXI protocol.

The MPU 601 can have an instruction fetch unit 605 configured to fetch instructions from a memory external to the MPU based on the input table result or at least a portion of the table result. The instruction fetch unit may support branches and/or linear code paths based on table results or a portion of a table result provided by a table engine. In some cases, the table result may comprise table data, key data and/or a start address of a set of instructions/program. Details about the table engine are described later herein. In some embodiments, the instruction fetch unit 605 can have an instruction cache 604 for storing one or more programs. In some cases, the one or more programs may be loaded into the instruction cache 604 upon receiving the start address of the program provided by the table engine. In some cases, a set of instructions or a program may be stored in a contiguous region of a memory unit, and the contiguous region can be identified by the address. In some cases, the one or more programs may be fetched and loaded from an external memory via the communication interface 602. This provides flexibility to allow for executing different programs associated with different types of data using the same processing unit. In an example, a management PHV can be injected into the pipeline, for example to perform administrative table direct memory access (DMA) operations or entry aging functions (i.e., adding timestamps), one of the management MPU programs may be loaded to the instruction cache to execute the management function. The instruction cache 604 can be implemented using various types of memories such as one or more SRAMs.

The one or more programs can be any programs such as P4 programs related to reading table data, building headers, DMA to/from memory, writing to/from memory, and various other actions. The one or more programs can be executed in any match-action unit.

The MPU 601 can have a register file unit 606 to stage data between the memory and the functional units of the MPU, or between the memory external to the MPU and the functional units of the MPU. The functional units may include, for example, ALUs, meters, counters, adders, shifters, edge detectors, zero detectors, condition code registers, status registers, and the like. In some cases, the register file unit 606 may comprise a plurality of general-purpose registers (e.g., R0, R1, . . . Rn) which may be initially loaded with metadata values then later used to store temporary variables within execution of a program until completion of the program. For example, the register file unit 606 may be used to store SRAM addresses, ternary content addressable memory (TCAM) search values, ALU operands, comparison sources, or action results. The register file unit of a stage may also provide data/program context to the register file of the subsequent stage, as well as making data/program context available to the next stage's execution data path (i.e., the source registers of the next stage's adder, shifter, and the like). In some embodiments, each register of the register file is 64 bits and may be initially loaded with special metadata values such as hash value from table lookup, packet size, PHV timestamp, programmable table constant and the like.

In some embodiments, the register file unit 606 can have a comparator flags unit (e.g., C0, C1, . . . Cn) configured to store comparator flags. The comparator flags can be set by calculation results generated by the ALU which in return can be compared with constant values in an encoded instruction to determine a conditional branch instruction. In some embodiments, the MPU can have one-bit comparator flags (e.g., 8 one-bit comparator flags). In practice, an MPU can have any number of comparator flag units each of which may have any suitable length.

The MPU 601 can have one or more functional units such as the ALU(s) 607. An ALU may support arithmetic and logical operations on the values stored in the register file unit 606. The results of the ALU operations (e.g., add, subtract, AND, OR, XOR, NOT, AND NOT, shift, and compare) may then be written back to the register file. The functional units of the MPU may, for example, update or modify fields anywhere in a PHV, write to memory (e.g., table flush), or perform operations that are not related to PHV update. For example, an ALU may be configured to perform calculations on descriptor rings, scatter gather lists (SGLs), and control data structures loaded into the general purpose registers from the host memory.

The MPU 601 can have other functional units such as meters, counters, action insert units, and the like. For example, an ALU may be configured to support P4 compliant meters. A meter is a type of action executable on a table match used to measure data flow rates. A meter may include a number of bands, typically two or three, each of which has a defined maximum data rate and optional burst size. Using a leaky bucket analogy, a meter band is a bucket filled by the packet data rate and drained at a constant allowed data rate. Overflow occurs if the integration of data rate exceeding quota is larger than the burst size. Overflowing one band triggers activity into the next band, which presumably allows a higher data rate. In some cases, a field of the packet may be marked as a result of overflowing the base band. This information might be used later to direct the packet to a different queue, where it may be more subject to delay or dropping in case of congestion. The counter may be implemented by the MPU instructions. The MPU can have one or more types of counters for different purposes. For example, the MPU can have performance counters to count MPU stalls. An action insert unit or set of instructions may be configured to push the register file result back to the PHV for header field modifications.

The MPU may be capable of locking a table. In some cases, a table being processed by an MPU may be locked or marked as "locked" in the table engine. For example, while an MPU has a table loaded into its register file, the table address may be reported back to the table engine, causing future reads to the same table address to stall until the MPU has released the table lock. For instance, the MPU may release the lock when an explicit table flush instruction is executed, the MPU program ends, or the MPU address is changed. In some cases, an MPU may lock more than one table address, for example, one for the previous table write-back and another address lock for the current MPU program.

In some embodiments, a single MPU may be configured to execute instructions of a program until completion of the program. In other embodiments, multiple MPUs may be configured to execute a program. A table result can be distributed to multiple MPUs. The table result may be distributed to multiple MPUs according to an MPU distribution mask configured for the tables. This provides advantages to prevent data stalls or mega packets per second (MPPS) decrease when a program is too long. For example, if a PHV requires four table reads in one stage, then each MPU program may be limited to only eight instructions in order to maintain a 100 MPPS if operating at a frequency of 800 MHz in which scenario multiple MPUs may be desirable.

Figure 7:
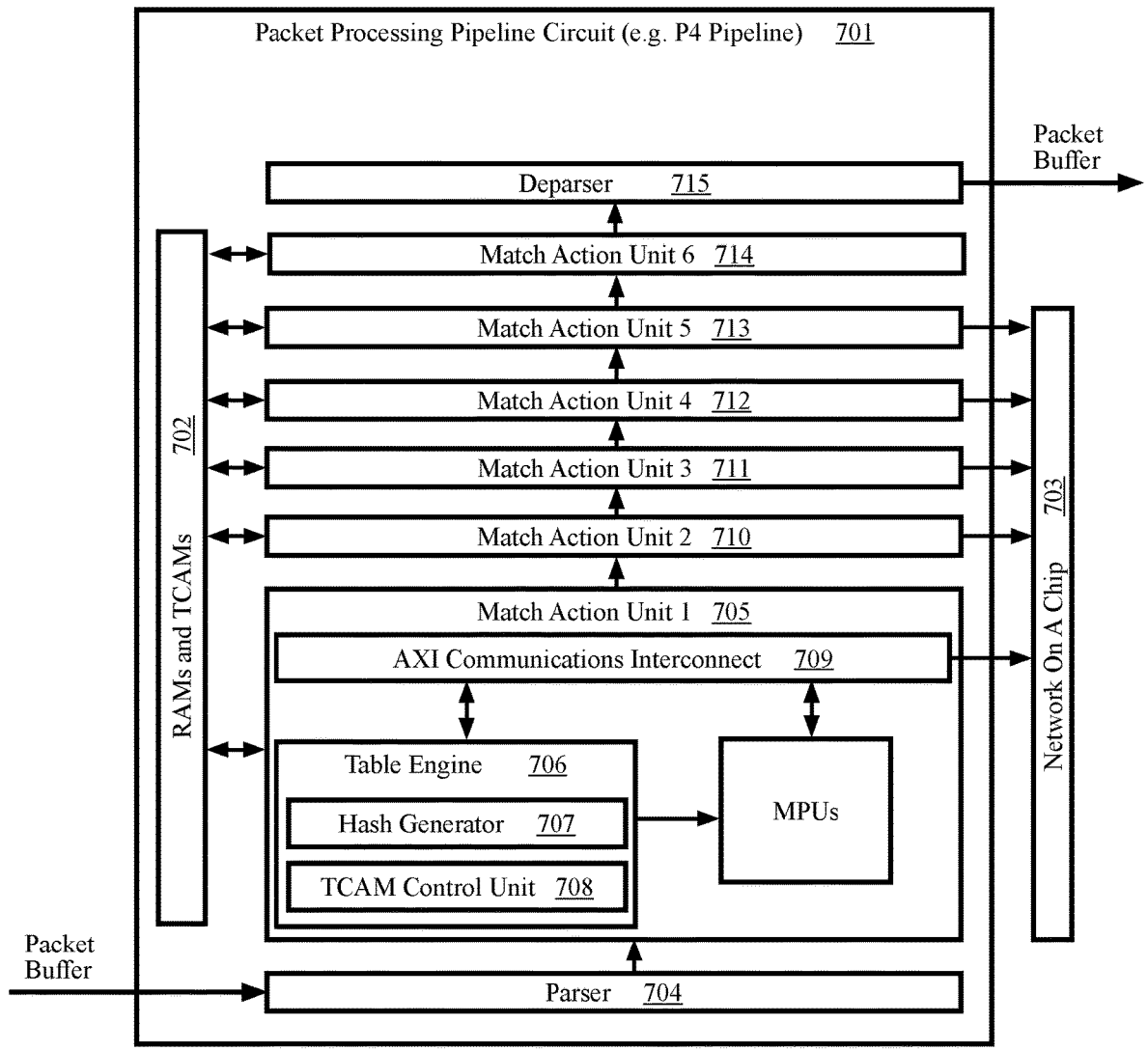
FIG. 7 illustrates a block diagram of a sub line rate packet processing circuit that may be used within the exemplary system of FIG. 4 according to some aspects.

FIG. 7 illustrates a block diagram of a packet processing circuit 701 that may be used within the exemplary system of FIG. 4. A P4 pipeline can be programmed to provide various features, including, but not limited to, routing, bridging, tunneling, forwarding, network ACLs, L4 firewalls, flow based rate limiting, VLAN tag policies, membership, isolation, multicast and group control, label push/pop operations, L4 load balancing, L4 flow tables for analytics and flow specific processing, DDOS attack detection, mitigation, telemetry data gathering on any packet field or flow state and various others.

A programmer or compiler may decompose a packet processing program into a set of dependent or independent table lookup and action processing stages (i.e., match-action) that can be mapped onto the table engine and MPU stages. The match-action pipeline can have a plurality of stages. For example, a packet entering the pipeline may be first parsed by a parser (e.g., parser 704) according to the packet header stack specified by a P4 program. This parsed representation of the packet may be referred to as a packet header vector (PHV). The PHV may then be passed through stages (e.g., stages 705, 710, 711, 712, 713, 714) of the match-action pipeline. Each pipeline stage can be configured to match one or more PHV fields to tables and to update the PHV, table entries, or other data according to the actions specified by the P4 program. If the required number of stages exceeds the implemented number of stages, a packet can be recirculated for additional processing. The packet payload may travel in a separate queue or buffer until it is reassembled with its PHV in a deparser 715. The deparser 715 can rewrite the original packet according to the PHV fields which may have been modified in the pipeline. A packet processed by an ingress pipeline may be placed in a packet buffer for scheduling and possible replication. In some cases, once the packet is scheduled and leaves the packet buffer, it may be parsed again to create an egress parsed header vector. The egress parsed header vector may be passed through a P4 egress pipeline in a similar fashion as a packet passing through a P4 ingress pipeline, after which a final deparser operation may be executed before the packet is sent to its destination interface or recirculated for additional processing. The network appliance 430 of FIG. 4 has a P4 pipeline that can be implemented via a packet processing circuit 701.

A pipeline can have multiple parsers and can have multiple deparsers. The parser can be a P4 compliant programmable parser and the deparser can be a P4 compliant programmable deparser. The parser may be configured to extract packet header fields according to P4 header definitions and place them in a PHV. The parser may select from any fields within the packet and align the information from the selected fields to create the PHV. The deparser can be configured to rewrite the original packet according to an updated PHV.

The pipeline MPUs of the match-action units 705, 710, 711, 712, 713, 714 can be the same as the MPU 601 of FIG. 6. Match-action units can have any number of MPUs. The match-action units of a match-action pipeline can all be identical.

A table engine 706 may be configured to support per-stage table match. For example, the table engine 706 may be configured to hash, lookup, and/or compare keys to table entries. The table engine 706 may be configured to control the address and size of the table, use PHV fields to generate a lookup key, and find Session Ids or MPU instruction pointers that define the P4 program associated with a table entry. A table result produced by the table engine can be distributed to the multiple MPUs.

The table engine 706 can be configured to control a table selection. In some cases, upon entering a stage, a PHV is examined to select which table(s) to enable for the arriving PHV.

Table selection criteria may be determined based on the information contained in the PHV. In some cases, a match table may be selected based on packet type information related to a packet type associated with the PHV. For instance, the table selection criteria may be based on packet type or protocols (e.g., Internet Protocol version 4 (IPv4), Internet Protocol version 6 (IPv6), MPLSA, or the next table ID as determined by the preceding stage. In some cases, the incoming PHV may be analyzed by the table selection logic, which then generates a table selection key and compares the result using a TCAM to select the active tables. A table selection key may be used to drive table hash generation, table data comparison, and associated data into the MPUs.

In some embodiments, the table engine 706 can have a hash generation unit 707. The hash generation unit may be configured to generate a hash result off a PHV input and the hash result may be used to conduct a DMA read from a DRAM or SRAM array. In an example, the input to the hash generation unit may be masked according to which bits in the table selection key contribute to the hash entropy. In some cases, the same mask may be used by the table engine for comparison with the returning SRAM read data. In some instances, the hash result may be scaled according to the table size, then the table base offset can be added to create a memory index. The memory index may be sent to the DRAM or SRAM array and to perform the read.

The table engine 706 can have a TCAM control unit 708. The TCAM control unit may be configured to allocate memory to store multiple TCAM search tables. In an example, a PHV table selection key may be directed to a TCAM search stage before a SRAM lookup. The TCAM control unit may be configured to allocate TCAMs to individual pipeline stages to prevent TCAM resource conflicts, or to allocate TCAM into multiple search tables within a stage. The TCAM search index results may be forwarded to the table engine for SRAM lookups.

The table engine 706 may be implemented by hardware or circuitry. The table engine may be hardware defined. In some cases, the results of table lookups or table results are provided to the MPU in its register file.

A match-action pipeline can have multiple match-action units such as the six units illustrated in the example of FIG. 7. In practice, a match-action pipeline can have any number of match-action units. The match-action units can share a common set of SRAMs and TCAMs 702. The SRAMs and TCAMs 702 may be components of the pipeline. This arrangement may allow the six match-action units to divide match table resources in any suitable proportion which provides convenience to the compiler and eases the compiler's task of resource mapping. Any suitable number of SRAM resources and any suitable number of TCAM resources may be used by each pipeline. For example, the illustrated pipeline can be coupled to ten SRAM resources and four or eight TCAM resources. In some instances, TCAMs may be fused vertically or horizontally for a wider or deeper search.

Figure 8:
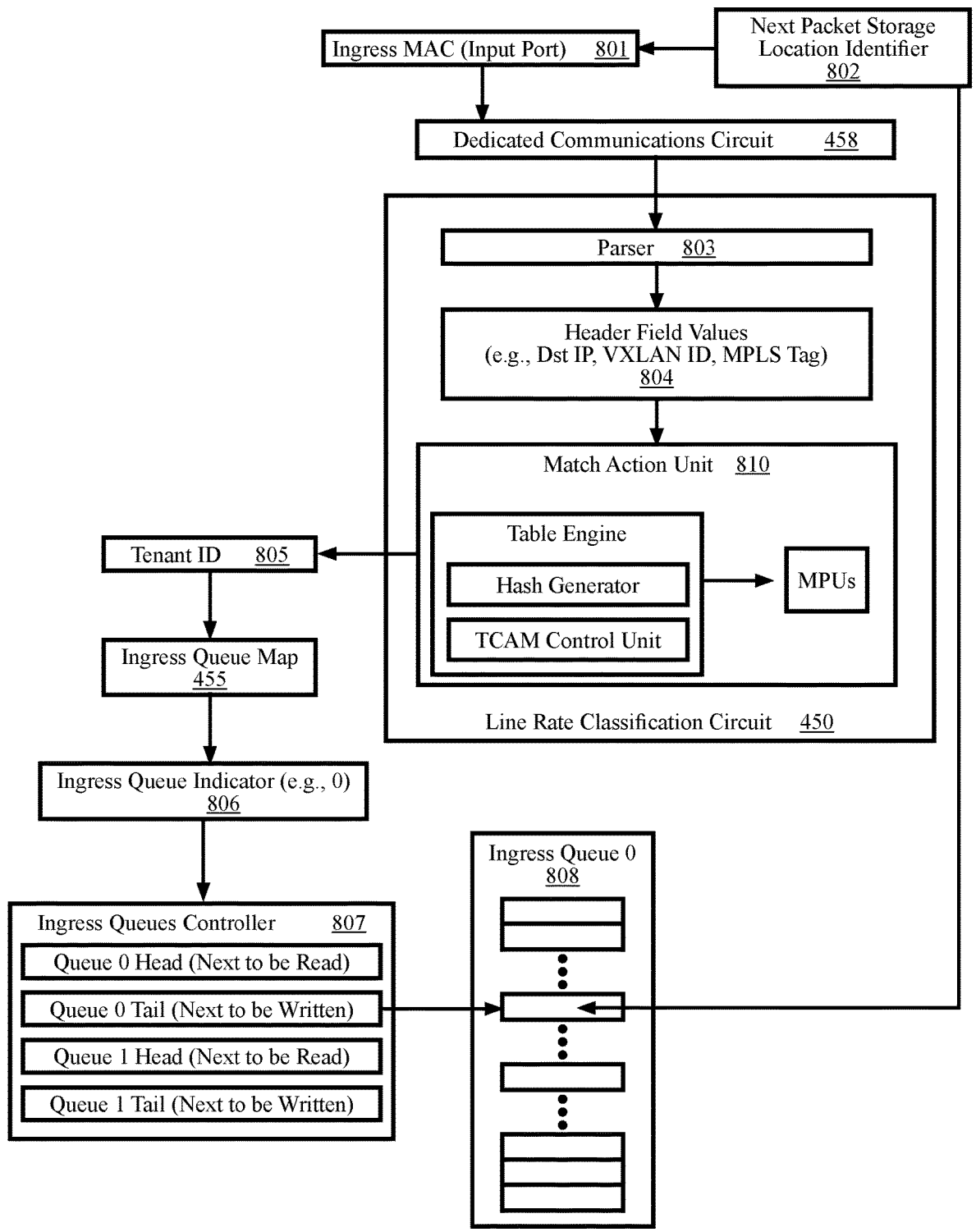
FIG. 8 is a high-level diagram that illustrates an input port using a dedicated communications circuit to communicate with a line rate classification circuit according to some aspects.

FIG. 8 is a high-level diagram that illustrates an input port 801 using a dedicated communications circuit 458 to communicate with a line rate classification circuit 450 according to some aspects. As discussed above, the input port 801 may write a packet into a packet buffer at the same time as it passes the packet to the line rate classification circuit 450. The next packet storage location identifier 802 can indicate a memory location in the packet buffer at which the next packet is to be written. The dedicated communications circuit 458 is a communications circuit that is separate and distinct from the NOC 402. The input port 801 may use the dedicated communications circuit 458 to pass the packet to the line rate classification circuit 450. The line rate classification circuit 450 can include a parser 803 and a match action unit 810. The parser 803 can parse the packet to obtain header field values 804 from the packet's header fields. The header field values can include one or more of the packet's destination IP address, VXLAN ID, VLAN tag, MPLS tag, etc. Notice that the listed fields are all layer 2 and layer 3 fields. In many deployments, a tenant can be identified using: the destination IP address and the VXLAN ID, the destination IP address and the VLAN tag; the MPLS tag; or some other combination of header fields. For example, within a rack or group of racks, a tenant may be assigned the subnet 192.168.50.0/24 and VLAN tag 33. As such, all packets addressed to that subnet and having that VLAN tag are addressed to one of that tenant's VMs.

The parsers 704 used in full featured packet processing pipeline circuits 701 are typically configurable such that they can be adapted to produce different PHVs for different situations such as parsing layer 7 HTTP fields. The parser 803 of a line rate classification circuit can be a much simpler circuit, particularly when it only needs to obtain field values from layer 2 headers, layer 3 headers, and perhaps fields inserted between those layers (e.g., MPLS). In fact, the parser 803 may be non-configurable. Similarly, the match-action unit 810 may be simplified when all that is required of it is to produce a tenant ID 805 by calculating a hash value based on the header field values 804. The hash value can be produced by a hash generator. The hash generator may produce the hash value using a hash function. Examples of hashing functions can include cyclic redundancy check algorithms, well-known hashing algorithms, and other algorithms. The tenant ID 805 may be mapped to an ingress queue indicator 806 using an ingress queue map 455. The ingress queue map may be a table and the tenant ID may be an index into the table. The size of the ingress queue map 455 may be a function of the size of the tenant ID. For example, a 5 bit tenant ID may be used as an index into a 32 entry table. The ingress queue map may be kept small in order to preserve line rate operation and to minimize the amount of chip area used for storing the ingress queue map near the line rate classification circuit. Based on current data center patterns, a 10 bit tenant ID may suffice. Based on data center growth patterns, a 14 bit tenant ID may be required to meet current and future needs. Here, the data center patterns and needs are related to the numbers of tenants in large scale data centers The ingress queues controller 807 can track the locations of the head and tail of each ingress queue. A head location can contain the buffer address of the next packet to be read. As such, the buffer scheduler 457 can read from the heads of the queues. When a packet is received, its location can be written to the tail of one of the ingress buffers. For example, a packet received at the input port 801 can be stored in the packet buffer 422 at the location indicated by the next packet storage location identifier 802. The line rate classifier 450 can determine a tenant ID 805 for the packet that is mapped to ingress queue 0 808. As such, the next packet storage location identifier 802 can be written to the tail of ingress queue 0 808.

Figure 9:
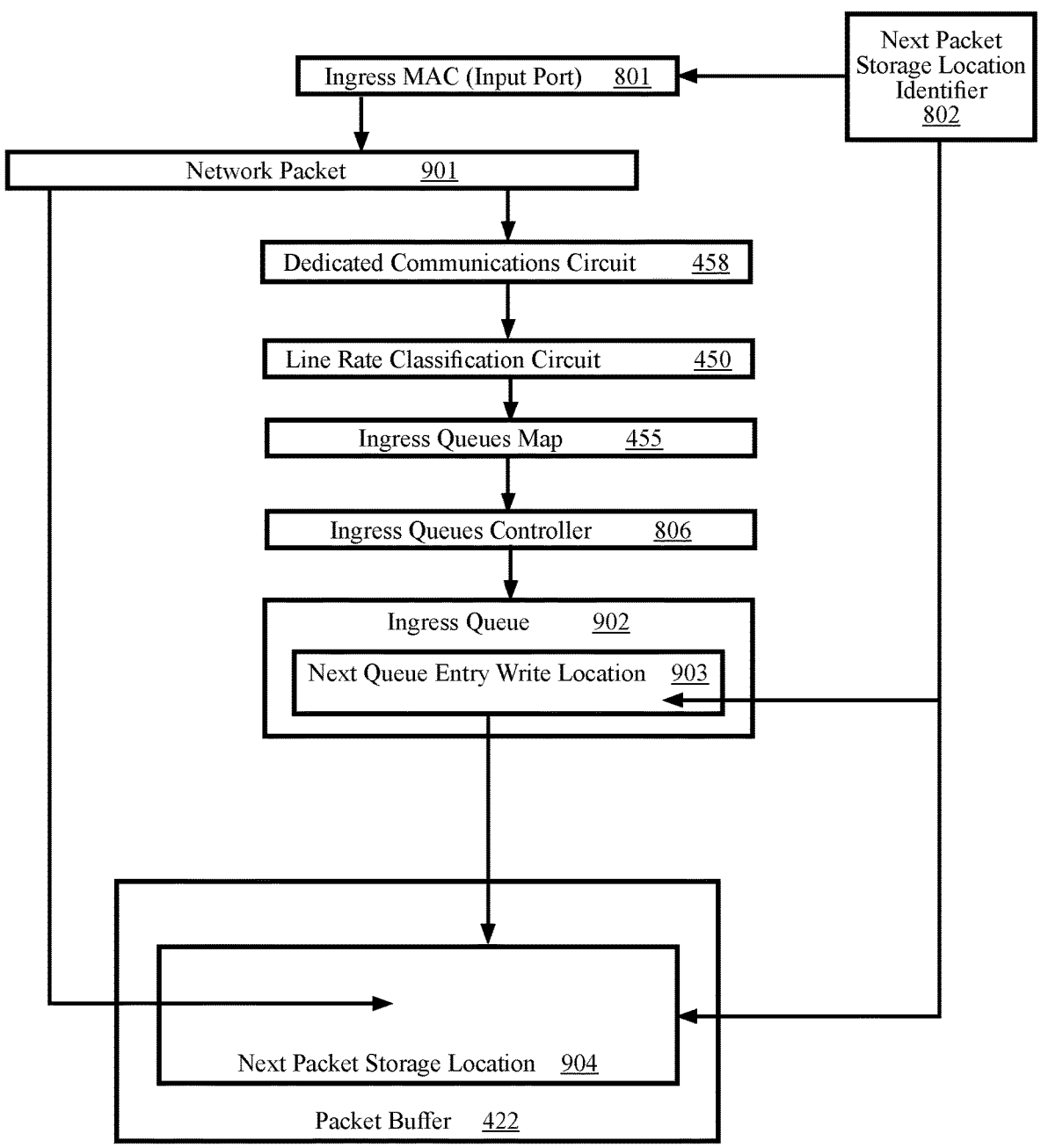
FIG. 9 is a high-level conceptual diagram that illustrates aspects of selecting an ingress queue and placing a packet on the selected ingress queue according to some aspects.

FIG. 9 is a high-level conceptual diagram that illustrates aspects of selecting an ingress queue and placing a packet on the selected ingress queue according to some aspects. The next packet storage location identifier 802 indicates that the next packet to be received should be written to the next packet storage location 904 of the packet buffer 422. As such, the input port 801 writes the network packet 901 into the next packet storage location 904. The input port also passes the network packet to the line rate classification circuit 450 via the dedicated communications circuit 458.

Figure 10:
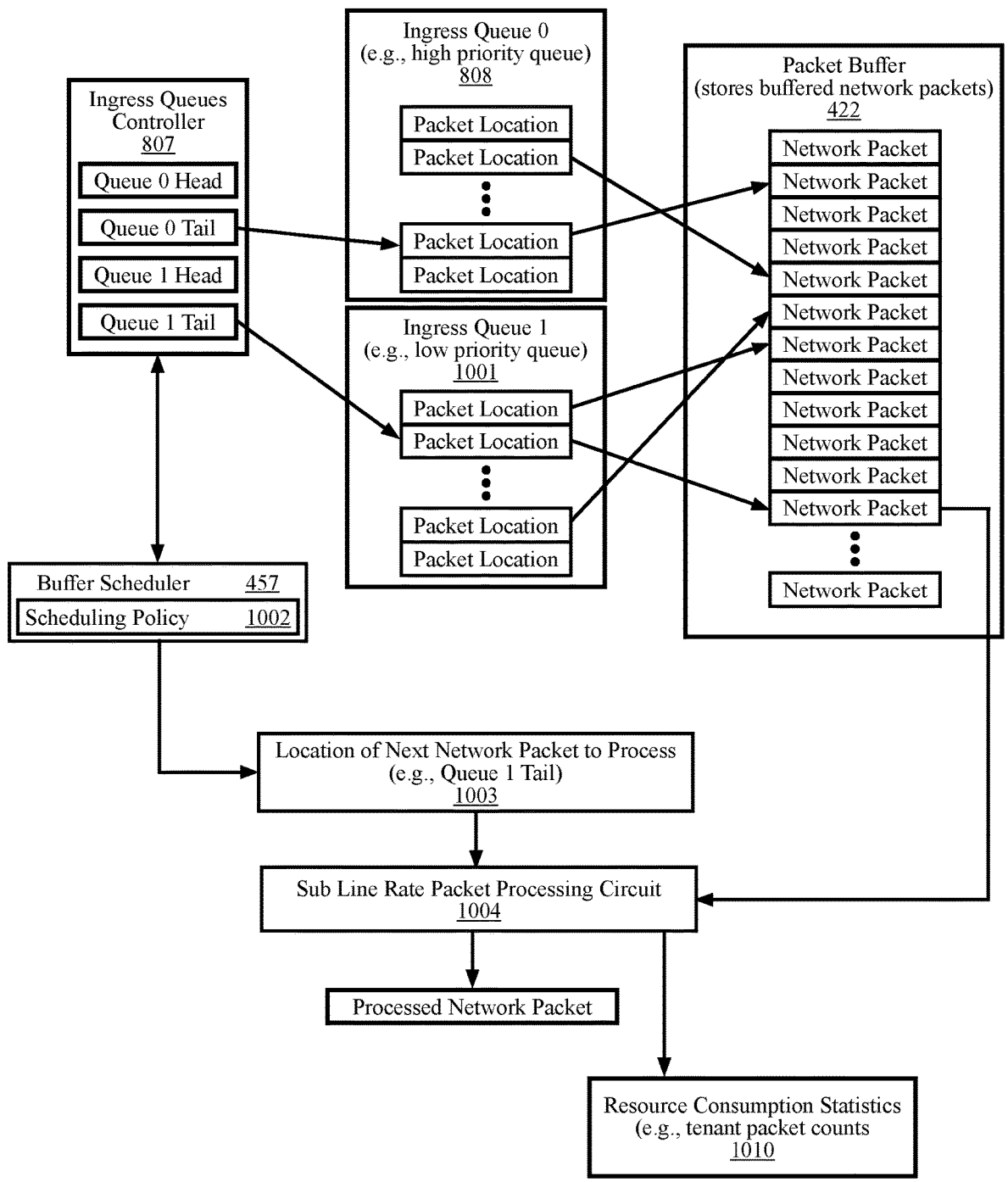
FIG. 10 illustrates a buffer scheduler selecting the next packet that is to be processed by a sub line rate packet processing circuit according to some aspects.

The tenant ID produced by the line rate classification circuit 450 is mapped to an ingress queue indicator via the ingress queues map 455. The ingress queue controller 807 can use the ingress queue indicator to select the tail of an ingress queue 902 as the next queue entry write location 903. The next packet storage location 904 can be written into the next queue entry write location 903 such that the next queue entry write location 903 indicates the location at which the network packet 901 has been stored. The queue controller may perform other operations such as moving the tail when the queue is written to, moving the head when the queue is read from, and causing the packet to be dropped (or written to a lower priority queue) when a queue is full. A packet may be dropped by leaving the next packet storage location unchanged after a packet is written to the packet buffer. As such, the dropped packet is overwritten by a subsequent packet FIG. 10 illustrates a buffer scheduler 457 selecting the next packet that is to be processed by a sub line rate packet processing circuit 1004 according to some aspects. The buffer scheduler 457 can implement a scheduling policy 1002 such as the well-known weighted round robin (WRR) policy, the highest priority first policy, or other scheduling policies. WRR preferentially selects from the highest priority queue and occasionally selects from lower priority queues. Highest priority first selects from a queue only when all higher priority queues are empty. Based on the scheduling policy 1002, the buffer scheduler 457 can access an ingress queue to obtain the location of the next packet to process 1003 and can provide that location to the sub line rate packet processing circuit 1004. The sub line rate packet processing circuit 1004 may access the packet buffer 422 and process the network packet at the location of the next packet to process 1003. The sub line rate packet processing circuit 1004 can produce a processed network packet by processing the network packet. The sub line rate packet processing circuit 1004 can also maintain resource consumption statistics 1010 for each tenant. The resource consumption statistics 1010 may indicate the number of network packets that have been processed (in total or over a time period) for each tenant, the network bandwidth consumed by each tenant over a time period, or other resource consumption statistics. The resource consumption statistics can be used to determine that a tenant is to be moved from one of the ingress queues to a different ingress queue. The sub line rate packet processing circuit can provide tenant service such as firewalling, load balancing, network address translations, packet rewriting, etc. Packets are provided to the sub line rate packet processing circuit via the ingress queues. As such a network packet is classified and placed on an ingress queue before tenant services are provided.

Figure 11:
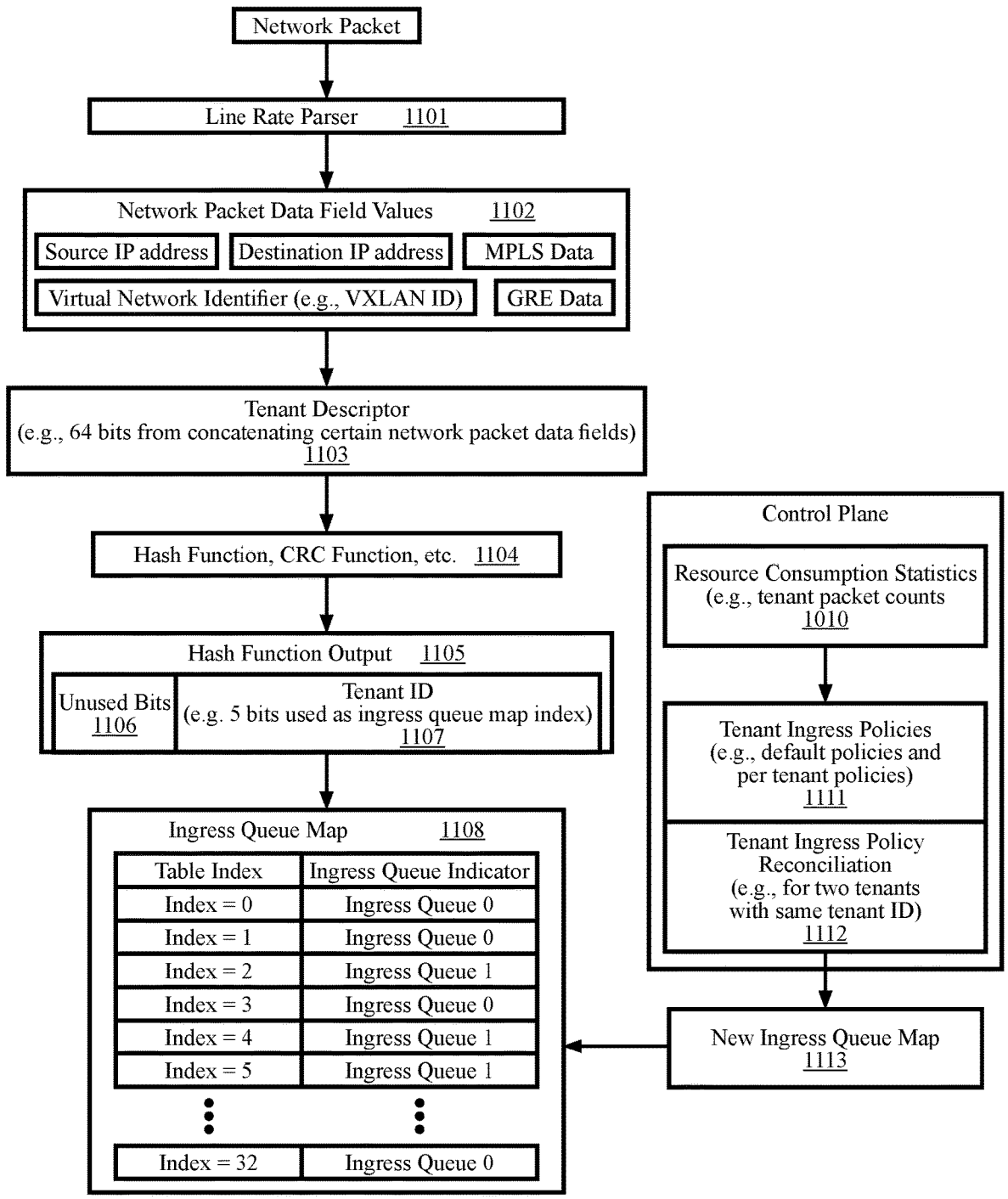
FIG. 11 is a high-level diagram illustrating the production and use of a tenant ID according to some aspects.

FIG. 11 is a high-level diagram illustrating the production and use of a tenant ID 1107 according to some aspects. The line rate classification circuit can include a line rate parser 1101 that can extract data field values 1102 from the header fields of a network packet. The data field values 1102 can be the network packet's source IP address, destination IP address, MPLS tag, virtual network identifier (e.g., VLAN tag, VXLAN ID, etc.), generic routing encapsulation (GRE) data, and other values from the packet header fields. IETF RFCs 1701, 1702, and 2784 are directed to the GRE protocol. The data field values 1102 can be used to produce a tenant descriptor. For example, the destination IP address (32 bits), VLAN tag (12 bits), and destination port (16 bits) can be concatenated to produce a 60 bit tenant descriptor 1103. The tenant descriptor is too large to be used as an index into a table because a 60 bit field can take $10^{18}$ values. The tenant descriptor may therefore be run through a hash function 1104. Those practiced in computer science are familiar with hash functions and understand the desirable properties of and the uses of hash functions. The hash function can be a cyclic redundancy check function, folding hash code function, mid-squares hash code function, division hashing function, algebraic coding function, or some other hash function. The hash function output 1105 can include unused bits 1106 and the tenant ID 1107. For example, the hash function can produce a 12 bit output of which the most significant 7 bits are unused and the least significant 5 bits are the tenant ID. The tenant ID 1107 can be used as an index into the ingress queue map 1108. Each entry into the ingress queue map can include an ingress queue indicator. As such, the ingress queue map can map a tenant ID to an ingress queue indicator.

The ingress queue map 1108 can be modified over time such that a specific tenant ID is mapped to different ingress queues at different times. The control plane can use the resource consumption statistics 1010 to determine that a tenant ID should be remapped to a different ingress queue. Tenant ingress policies 1111 can specify the conditions for selecting an ingress queue for a tenant. For example, a tenant's minimum bandwidth guarantee can be specified in an SLA. That tenant can be moved to the highest priority ingress queue whenever that tenant has been using less than the guaranteed bandwidth. A tenant may be moved to the lowest priority queue when that tenant has been using more bandwidth than a specified maximum value. That maximum value can be, for example, a maximum specified in the SLA, the minimum guaranteed bandwidth plus an allowable excess amount, or some other value. An example of minimum guaranteed bandwidth plus an allowable excess amount is: 500 Mbps (minimum) plus 50 Mbps (allowable excess) which equals 550 Mbps. Many tenants will remain assigned to the ingress queue that they are currently assigned to.

A new ingress queue map can be determined by determining the tenant ID for each tenant and setting the values stored in the new ingress queue map as indicated by the resource consumption statistics 1010 and the tenant ingress policies 1111. In some instances, tenant ingress policy reconciliation 1112 may be necessary because two tenants may have the same tenant ID. Tenants having the same tenant ID will use the same ingress queue because the ingress queue map will map that tenant ID to one ingress queue. The tenant ingress policy reconciliation 1112 may indicate that tenants having the same tenant ID are to be assigned to the highest priority queue that either tenant is assigned to.

Figure 12:
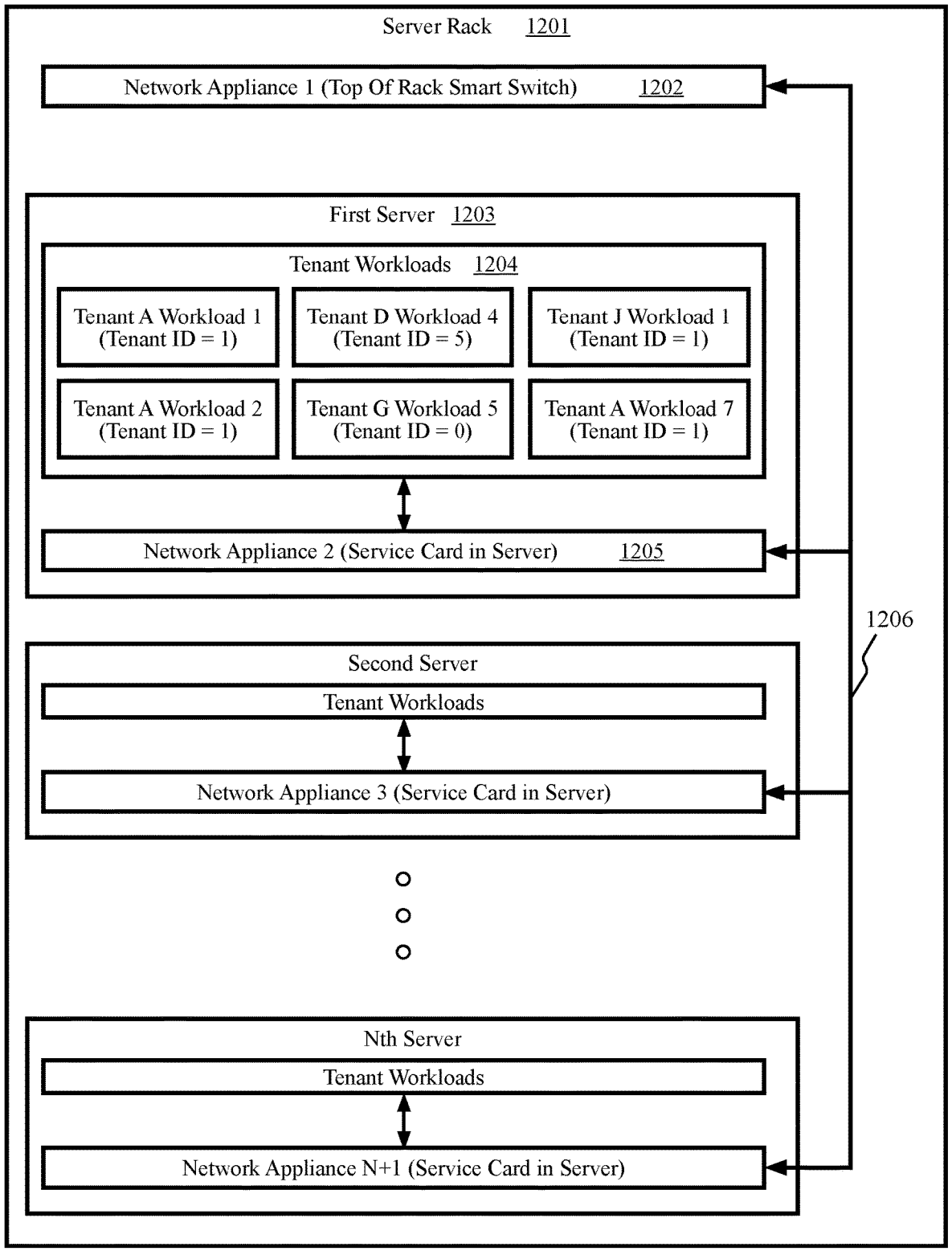
FIG. 12 is a high-level block diagram illustrating network appliances and servers in a server rack according to some aspects.

FIG. 12 is a high-level block diagram illustrating network appliances and servers in a server rack 1201 according to some aspects. Computing equipment is often mounted in racks and a data center can have many rows of racks. A rack can have a top of rack (TOR) switch 1202. The TOR switch is a network appliance that is tasked with carrying network traffic between the devices inside the rack and the world outside the rack. In FIG. 12, the TOR switch is network appliance 1. The devices inside the rack can include servers such as the first server, the second server, the Nth server, and all the servers between the second and the Nth. Each server can include a service card and can run a number of tenant workloads. The service cards can be network appliances such as NICs, smart NICs, or distributed service cards. The server rack 1201 can have an internal network 1206 that carries network traffic between the service cards and the TOR switch 1202. The workloads can be server processes and VMs running on behalf of the tenants. The service cards provide network services for the tenant workloads. The service cards can be network appliances such as the network appliance 430 illustrated in FIG. 4. The service cards can thereby have numerous ingress queues and can use different ingress queues for different tenants.

The first server 1203 is running tenant workloads for tenant A, tenant D, tenant G, and tenant J. The tenant ID of tenant A is "1". The tenant ID of tenant D is "5". The tenant ID of tenant G is "0". The tenant ID of tenant J is "1". The service card 1205 in the first server 1203 provides network service and connectivity to the tenant workloads 1204. The service card can use different ingress queues for the different tenants. However, tenant A and tenant J will use the same ingress queue because they have the same tenant ID.

FIG. 13 illustrates a high-level flow diagram of a process that updates per tenant resource consumption statistics 1010 according to some aspects. The process illustrated in FIG. 13 can be performed by the sub line rate packet processing circuit. After the start, a network packet is received at block 1301. For example, the sub line rate packet processing circuit can receive a network packet after the buffer scheduler provides the location of the network packet to the sub line rate packet processing circuit. At block 1302, the network packet is processed. At block 1303, the tenant to whom the network packet has been sent is identified. At block 1304, the per tenant resource consumption statistics can be updated for the tenant identified at block 1303.

FIG. 14 illustrates a per tenant ingress queue map 1401 in accordance with some aspects. The per tenant ingress queue map 1401 can be maintained by the control plane and used to create new ingress queue maps such as new ingress queue map 1113. The per tenant ingress queue map 1401 can be organized as a table that associates tenant names, tenant IDs, and ingress queue indicators.

FIG. 15 is a high-level flow diagram illustrating an exemplary process 1500 that uses a per tenant ingress queue map for maintaining an ingress queue map according to some aspects. After the start, the per tenant ingress queue map is updated at block 1501. As discussed above, the resource consumption statistics 1010 and the tenant ingress policies 1111 can be used to assign each tenant to an ingress queue. At block 1502, the entries in the per tenant ingress queue map can be reconciled. At block 1503, the per tenant ingress queue map can be used to produce a new ingress queue map. At block 1504, the new ingress queue map can be written into the line rate classification circuit at which time the new ingress queue map becomes the current ingress queue map 455.

Figure 16:
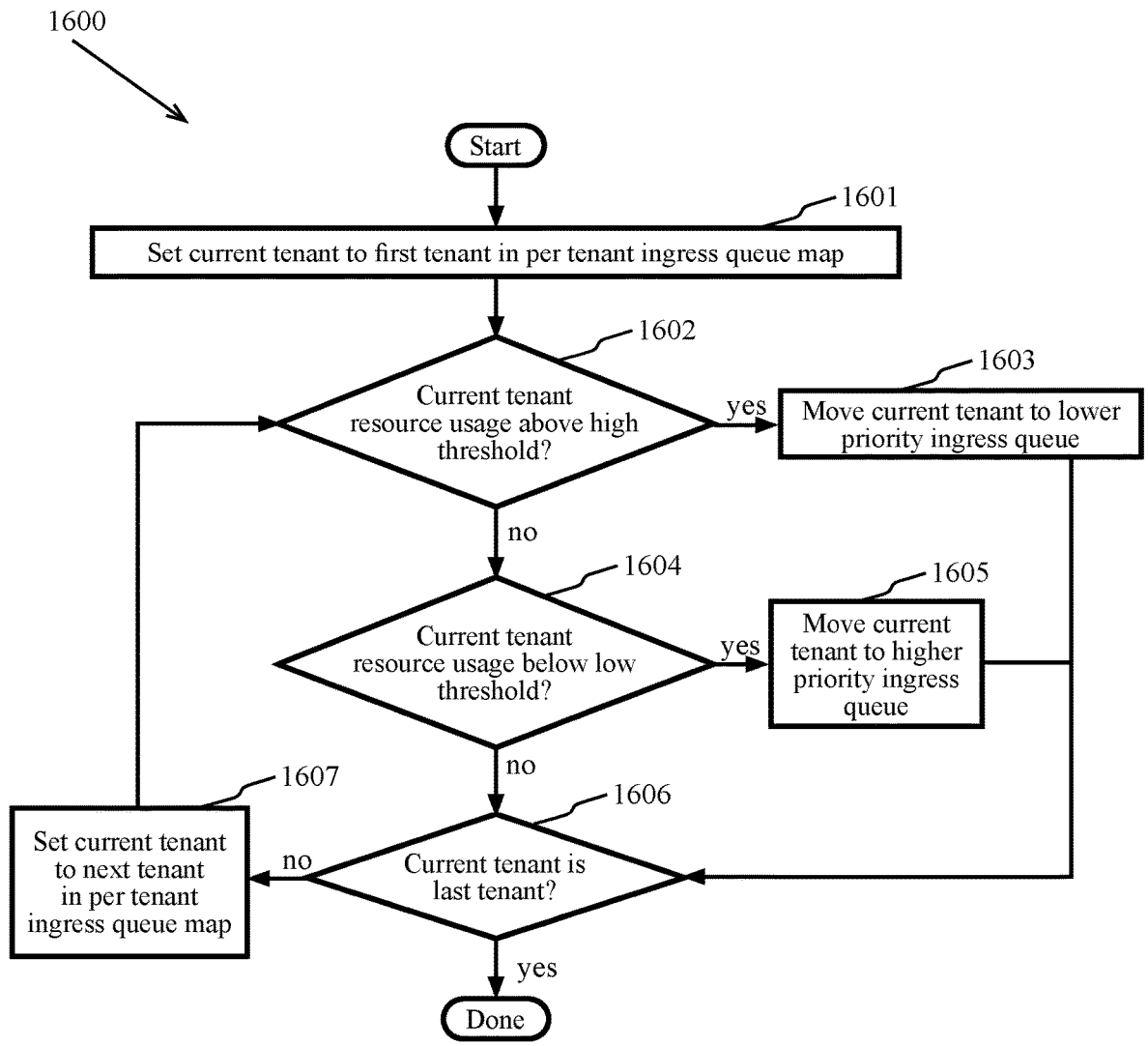
FIG. 16 is a high-level flow diagram illustrating an exemplary process that updates a per tenant ingress queue map in preparation for writing a new ingress queue map to a line speed classification circuit according to some aspects.

FIG. 16 is a high-level flow diagram illustrating an exemplary process 1600 that updates a per tenant ingress queue map in preparation for writing a new ingress queue map to a line speed classification circuit according to some aspects. After the start, at block 1601 the process can set the current tenant to the first tenant in the per tenant ingress queue map. At decision block 1602, the process can use the resource consumption statistics 1010 to determine if the current tenant resource usage is above a high threshold. The high threshold can be the specified maximum value for a statistic such as the bandwidth used, number of packets processed, etc. If the current tenant resource usage is below the high threshold, then the process can proceed to decision block 1604, otherwise the process can proceed to block 1603. At block 1603, the process can move the tenant to a lower priority ingress queue by changing the ingress queue indicator associated with the tenant in the per tenant ingress queue map. At decision block 1604, the process can use the resource consumption statistics 1010 to determine if the current tenant resource usage is below a low threshold. The low threshold can be the resource usage level guaranteed by a service level agreement. If the current tenant resource usage is below the low threshold, then the process can proceed to block 1605, otherwise the process can proceed to decision block 1606. At block 1605, the process can move the tenant to a higher priority ingress queue by changing the ingress queue indicator associated with the tenant in the per tenant ingress queue map. At decision block 1606, the process can determine if the current tenant is the last tenant in the per tenant ingress queue map 1401. If the current tenant is the last tenant in the per tenant ingress queue map the process is done, otherwise the process can proceed to block 1607. At block 1607, the process can set the current tenant to the next tenant in the ingress queue map before looping back to decision block 1602.

Figure 17:
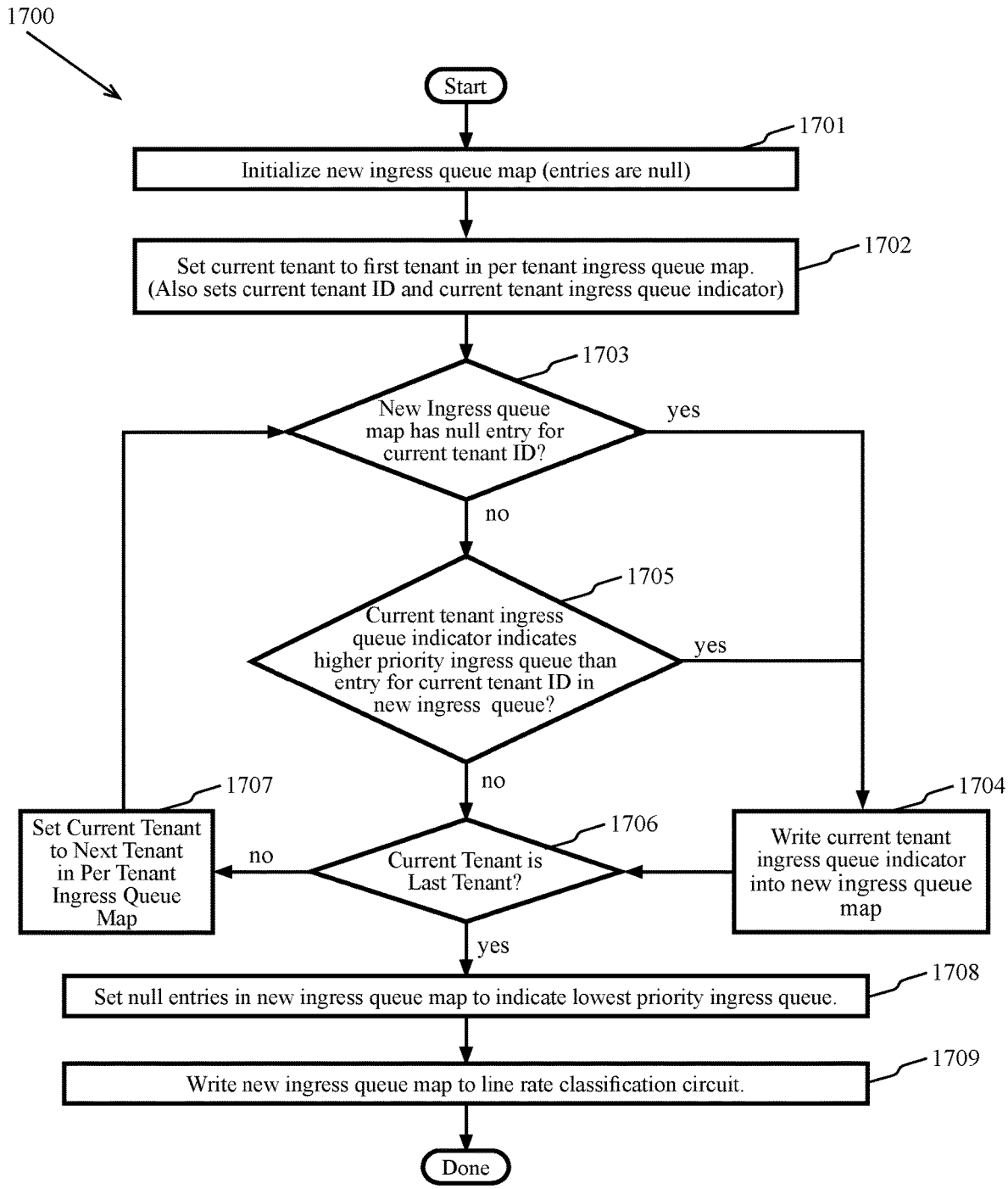
FIG. 17 is a high-level flow illustrating an exemplary process that performs policy reconciliation when two tenants have the same tenant ID according to some aspects.

FIG. 17 is a high-level flow illustrating an exemplary process 1700 that performs policy reconciliation when two tenants have the same tenant ID according to some aspects. After the start, at block 1701 the process can initialize a new ingress queue map. At block 1702, the process can set the current tenant to the first tenant in the per tenant ingress queue map. When setting the current tenant, the process also sets the current tenant ID and the current tenant ingress queue indicator to the tenant ID and ingress queue indicator associated with that tenant in the per tenant ingress queue map. At decision block 1703, the process can determine if the new ingress queue has a null entry for the current tenant ID. Here, the new ingress queue is checked to determine if an ingress queue indicator has already been written into the location indexed by the tenant ID. A null entry indicates no value has yet been written. If the new ingress queue has a null entry for the current tenant ID, then the process can proceed to block 1704, otherwise the process can proceed to decision block 1705. At decision block 1705, the process can determine if the current tenant ingress queue indicator indicates a higher priority ingress queue than the entry for the current tenant ID in the new ingress queue. If not, the process can proceed to decision block 1706, otherwise the process can proceed to block 1704. At block 1704, the process can write the current tenant ingress queue indicator into the new ingress queue map. At decision block 1706, the process can determine if the current tenant is the last tenant in the per tenant ingress queue map. If the current tenant is the last tenant in the per tenant ingress queue map the process can proceed to block 1708, otherwise the process can proceed to block 1707. At block 1707, the process can set the current tenant to the next tenant in the per tenant ingress queue map before looping back to decision block 1703. When setting the current tenant, the process also sets the current tenant ID and the current tenant ingress queue indicator to the tenant ID and ingress queue indicator associated with that tenant in the per tenant ingress queue map. At block 1708, the process can set null entries in the new ingress queue map to indicate the lowest priority ingress queue. Alternatively, at block 1708, the process can set null entries in the new ingress queue map to indicate the highest priority ingress queue or some other predetermined ingress queue. At block 1709, the process can write the new ingress queue map to the line rate classification circuit.

Figure 18:
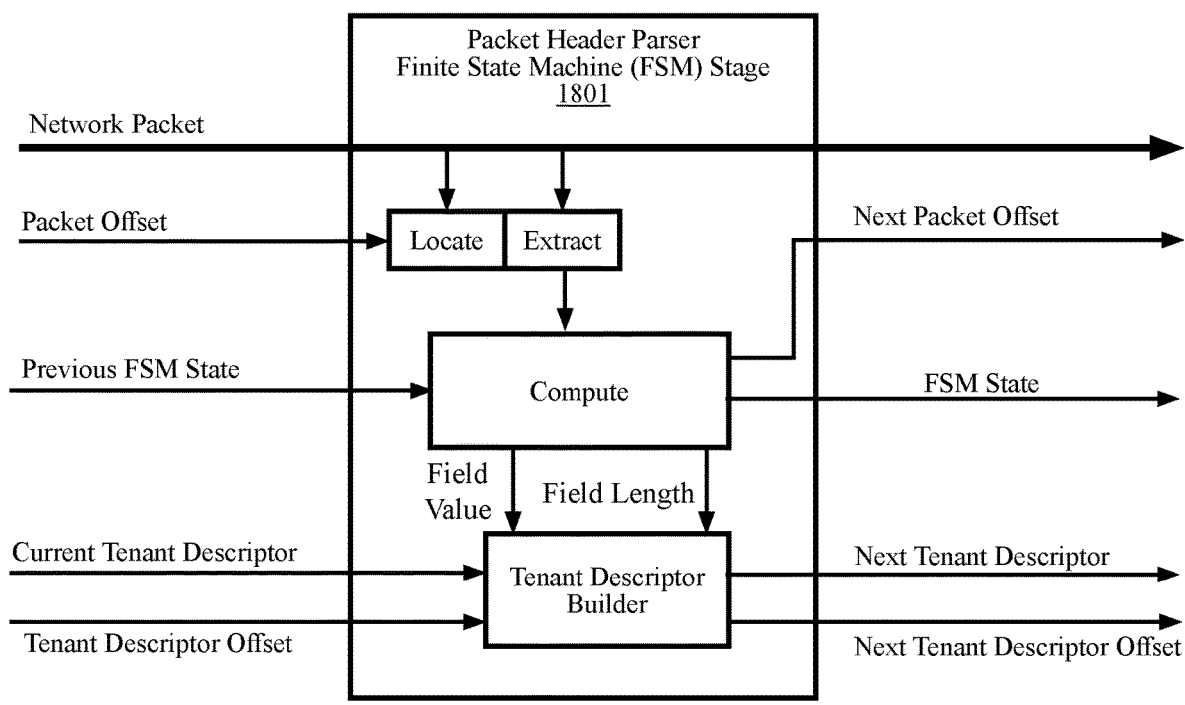
FIG. 18 is a high-level block diagram illustrating a packet header parser finite state machine (FSM) stage according to some aspects.

FIG. 18 is a high-level block diagram illustrating a packet header parser finite state machine (FSM) stage 1801 according to some aspects. In many applications, match-action units, such as the match action unit 810 of FIG. 8, are too slow to parse network packets or network packet headers at line speed. Those practiced in the art of packet parsing circuits are aware of finite state machine circuits that can parse network packets at line speed. Such an FSM can obtain tenant descriptors from packets at line speed. The FSM can include a number of FSM stages 1801. The inputs to the FSM stage 1801 can be a network packet, a packet offset, a previous FSM state, a current tenant descriptor, and a tenant descriptor offset. The packet offset can indicate the location of the next packet field that is to be examined by an FSM stage. The FSM state can include data that may be useful for the next FSM stage. The current tenant descriptor can include the header field values that have been determined thus far for producing a tenant descriptor. The tenant descriptor offset can indicate the location in the current tenant descriptor at which the next header field value is to be copied into the current tenant descriptor.

The locate and extract blocks can extract a field value from the packet that is located at the packet offset. The compute block can use the field value that has been extracted and can output the next packet offset for use by the next FSM stage. The compute block can also provide the field value and the length of the field value to a tenant descriptor builder. The tenant descriptor builder can assemble a tenant descriptor by inserting field values into the current tenant descriptor at the tenant descriptor offset. The tenant descriptor builder can produce a next tenant descriptor and a next tenant descriptor offset for use by the next FSM stage. The network packet can pass from one FSM stage to the next.

Figure 19:
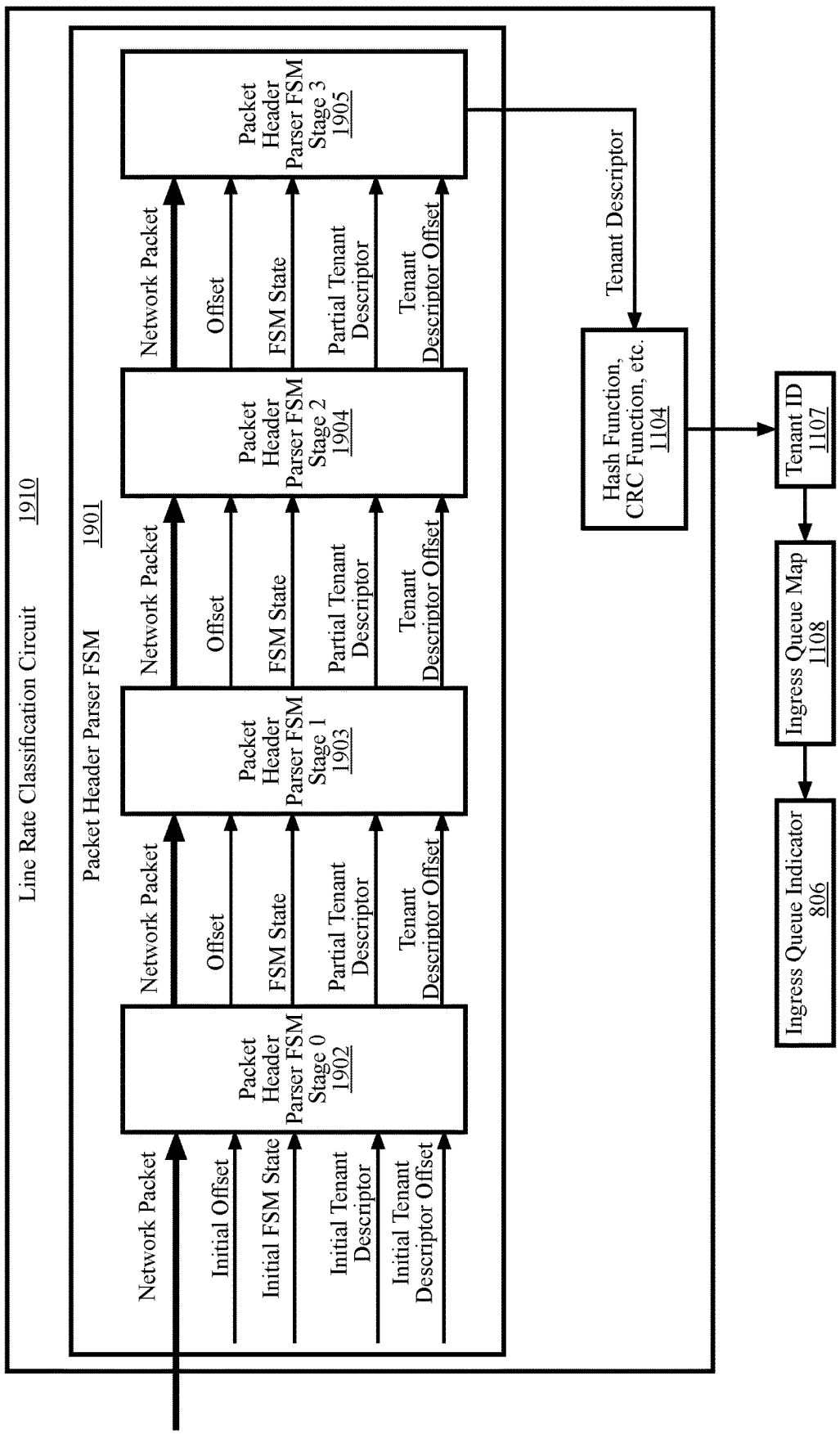
FIG. 19 is a high-level block diagram illustrating a line rate classification circuit that includes a packet header parser FSM 1901 according to some aspects.

FIG. 19 is a high-level block diagram illustrating a line rate classification circuit 1910 that includes a packet header parser FSM 1901 according to some aspects. The packet header parser FSM 1901 can include numerous packet header parser FSM stages such as packet header parser FSM stage 0 1902, packet header parser FSM stage 1 1903, packet header parser FSM stage 2 1904, and packet header parser FSM stage 3 1905. The last stage of the packet header parser FSM 1901 can output a tenant descriptor 1103. A hash function 1104 can use the tenant descriptor 1103 to produce a tenant ID 1107 that is output by the line rate classification circuit 1910. An ingress queue map 1108 can be used to determine an ingress queue indicator 806 for the tenant ID 1107.

Figure 20:
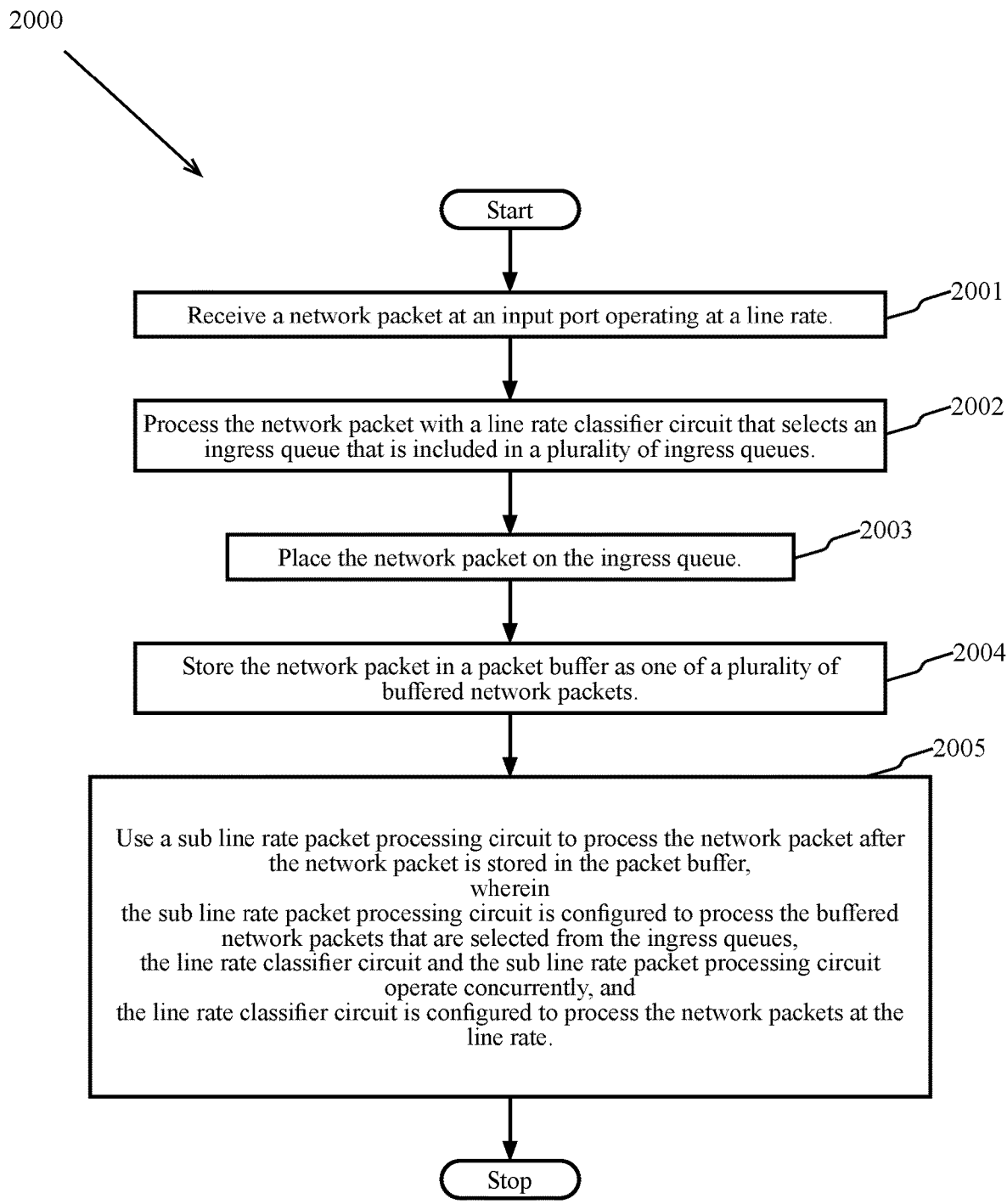
FIG. 20 is a high-level flow diagram illustrating a method that uses a line rate packet classifier for presorting network packets onto ingress queues.

FIG. 20 is a high-level flow diagram illustrating a method 2000 that uses a line rate packet classifier for presorting network packets onto ingress queues. The packets are presorted by placing them on the ingress queues before they are processed by the sub line rate packet processing circuit. At block 2001, the process can receive a network packet at an input port operating at a line rate. At block 2002, the process can process the network packet with a line rate classifier circuit that selects an ingress queue that is included in a plurality of ingress queues. At block 2003, the process can place the network packet on the ingress queue. At block 2004, the process can store the network packet in a packet buffer as one of a plurality of buffered network packets. At block 2005, the process can use a sub line rate packet processing circuit to process the network packet after the network packet is stored in the packet buffer, wherein the sub line rate packet processing circuit is configured to process the buffered network packets that are selected from the ingress queues, the line rate classifier circuit and the sub line rate packet processing circuit operate concurrently, and the line rate classifier circuit is configured to process the network packets at the line rate.

Aspects described above can be ultimately implemented in a network appliance that includes physical circuits that implement digital data processing, storage, and communications. The network appliance can include processing circuits, ROM, RAM, CAM, and at least one interface (interface(s)). The CPU cores described above are implemented in processing circuits and memory that is integrated into the same integrated circuit (IC) device as ASIC circuits and memory that are used to implement the programmable packet processing pipeline. For example, the CPU cores and ASIC circuits are fabricated on the same semiconductor substrate to form a System-on-Chip (SoC). The network appliance may be embodied as a single IC device (e.g., fabricated on a single substrate) or the network appliance may be embodied as a system that includes multiple IC devices connected by, for example, a printed circuit board (PCB). The interfaces may include network interfaces (e.g., Ethernet interfaces and/or InfiniBand interfaces) and/or PCI Express (PCIe) interfaces. The interfaces may also include other management and control interfaces such as I2C, general purpose IOs, USB, UART, SPI, and eMMC.

As used herein the terms "packet" and "frame" may be used interchangeably to refer to a protocol data unit (PDU) that includes a header portion and a payload portion and that is communicated via a network protocol or protocols. A PDU may be referred to as a "frame" in the context of Layer 2 (the data link layer) and as a "packet" in the context of Layer 3 (the network layer). For reference, according to the P4 specification: a network packet is a formatted unit of data carried by a packet-switched network; a packet header is formatted data at the beginning of a packet in which a given packet may contain a sequence of packet headers representing different network protocols; a packet payload is packet data that follows the packet headers; a packet-processing system is a data-processing system designed for processing network packets, which, in general, implement control plane and data plane algorithms; and a target is a packet-processing system capable of executing a P4 program.

Although the operations of the method(s) herein are shown and described in a particular order, the order of the operations of each method may be altered so that certain operations may be performed in an inverse order or so that certain operations may be performed, at least in part, concurrently with other operations. Instructions or sub-operations of distinct operations may be implemented in an intermittent and/or alternating manner.

It should also be noted that at least some of the operations for the methods described herein may be implemented using software instructions stored on a computer usable storage medium for execution by a computer. As an example, an embodiment of a computer program product includes a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A network appliance comprising:
an input port configured to receive a plurality of network packets at a line rate;
a plurality of ingress queues;
a line rate classification circuit configured to place the network packets on the ingress queues at the line rate;
a packet buffer configured to store the network packets; and
a sub line rate packet processing circuit configured to process the network packets that are stored in the packet buffer,
wherein the line rate classification circuit is configured to place a network packet that is one of the network packets on an ingress queue that is included in the ingress queues based on a tenant ID that is calculated using a packet header contents of the network packet.

2. The network appliance of claim 1 further including:
a dedicated communications circuit configured to pass the network packets from the input port to the line rate classification circuit; and
an on-chip communications fabric that the sub line rate packet processing circuit is configured to use to access the network packets that are stored in the packet buffer,
wherein
the dedicated communications circuit is distinct from the on-chip communications fabric.

3. The network appliance of claim 1, further including:
an ingress queue map configured to map a plurality of tenant IDs to the ingress queues,
wherein
the line rate classification circuit is configured to use the network packet to calculate the tenant ID, and
the network packet is placed on the one of the ingress queues associated with the tenant ID by the ingress queue map.

4. The network appliance of claim 3, wherein:
the ingress queues include a high priority queue and a low priority queue; and
the sub line rate packet processing circuit preferably processes the network packets on the high priority queue over the network packets on the low priority queue.

5. The network appliance of claim 4, wherein:
the ingress queue map associates one of the tenant IDs with the high priority queue; and
the network appliance is configured to adjust the ingress queue map to move one of the tenant IDs from association with the high priority queue to association with the low priority queue based on a resource consumption statistic associated with the one of the tenant IDs.

6. The network appliance of claim 3, wherein:
the network appliance is configured to adjust the ingress queue map to move one of the tenant IDs from association with one of the ingress queues to association with a different one of the ingress queues.

7. The network appliance of claim 3, wherein:
the network appliance is configured to produce a resource consumption statistic for a tenant that is associated with the tenant ID, and
the network appliance is configured to adjust the ingress queue map to move the tenant ID from association with a first one of the ingress queues to association with a second one of the ingress queues based on the resource consumption statistic.

8. The network appliance of claim 7, wherein:
the network appliance is installed in a server running a plurality of workloads for a plurality of tenants that includes the tenant; and
the tenant IDs are associated with the tenants.

9. The network appliance of claim 7, wherein:
the network appliance is a top of rack network appliance providing network services to a plurality of servers running a plurality of workloads for a plurality of tenants that includes the tenant; and
the tenant IDs are associated with the tenants.

10. The network appliance of claim 7, wherein:
each of the tenant IDs is represented by no more than 12 bits in the ingress queue map.

11. The network appliance of claim 3, wherein:
the line rate classification circuit uses a hash function to produce the tenant ID.

12. The network appliance of claim 11, wherein:
the network appliance is configured to provide a first tenant with a first level of service;
the network appliance is configured to provide a second tenant with a second level of service;
an identical tenant ID is calculated for the first tenant and the second tenant; and
network traffic for the first tenant and for the second tenant is queued to a same one of the ingress queues.

13. The network appliance of claim 1, wherein:
the network appliance is configured to drop packets from the ingress queues when at least one of the ingress queues is full and the network appliance is receiving network traffic faster than the sub line rate packet processing circuit can process the network traffic.

14. A method comprising:
receiving a network packet at an input port operating at a line rate;
processing the network packet with a line rate classifier circuit that selects an ingress queue that is included in a plurality of ingress queues;
placing the network packet on the ingress queue;
storing the network packet in a packet buffer as one of a plurality of buffered network packets; and
using a sub line rate packet processing circuit to process the network packet after the network packet is stored in the packet buffer,
wherein
the sub line rate packet processing circuit is configured to process the buffered network packets that are selected from the ingress queues,
the line rate classifier circuit and the sub line rate packet processing circuit operate concurrently, and
the line rate classifier circuit is configured to process the network packets at the line rate.

15. The method of claim 14 wherein:
the network packet is one of a plurality of network packets received by the input port; and
the line rate classifier circuit processes every one of the network packets.

16. The method of claim 15 wherein at least one of the network packets is dropped before the one of the network packets is processed by the sub line rate packet processing circuit.

17. The method of claim 14 wherein:
the sub line rate packet processing circuit is configured to use an on-chip communications fabric to access the packet buffer; and the line rate classifier circuit receives the network packet from the input port via a dedicated communications circuit that is distinct from the on-chip communications fabric.

18. The method of claim 14, wherein:

an ingress queue map is configured to associate a plurality of tenant IDs with the ingress queues;

the line rate classification circuit is configured to use the network packet to calculate a tenant ID that is one of the tenant IDs; and the network packet is placed on the ingress queue that is associated with the tenant ID by the ingress queue map.

19. A network appliance comprising:

an input means for receiving a network packet at a line rate;

a plurality of ingress queues;

a line rate classifier means for processing the network packet to select one of the ingress queues;

a packet buffer means for storing the network packet as one of a plurality of buffered network packets; and a sub line rate processing means for processing the network packet after the network packet is stored in the packet buffer means, wherein:

the line rate classification means places the network packet on the one of the ingress queues after using the network packet to select the one of the ingress queues;

the sub line rate processing means is configured to process the buffered network packets that are selected from the ingress queues;

the line rate classifier means and the sub line rate processing means operate concurrently; and the line rate classifier means is configured to process the network packets at the line rate.

20. The network appliance of claim 19, wherein:

the line rate classifier means is configured to processes every one of a plurality of network packets received by the input means.

* * * * *